(12) United States Patent
Yoshida

(10) Patent No.: US 8,323,512 B2
(45) Date of Patent: Dec. 4, 2012

(54) METHOD OF AND APPARATUS FOR PRODUCING SUB-CRITICAL WATER DECOMPOSITION PRODUCTS

(75) Inventor: Hiroyuki Yoshida, Sakai (JP)

(73) Assignee: Osaka Prefecture University Public Corporation, Osaka (JP)

( * ) Notice: Subject to any disclaimer, the term of this patent is extended or adjusted under 35 U.S.C. 154(b) by 197 days.

(21) Appl. No.: 10/589,331

(22) PCT Filed: Feb. 14, 2005

(86) PCT No.: PCT/JP2005/002181
§ 371 (c)(1),
(2), (4) Date: Aug. 14, 2006

(87) PCT Pub. No.: WO2005/077514
PCT Pub. Date: Aug. 25, 2005

(65) Prior Publication Data
US 2007/0160524 A1 Jul. 12, 2007

(30) Foreign Application Priority Data

Feb. 13, 2004 (JP) .................................. 2004-36027
Aug. 13, 2004 (JP) ................................ 2004-236163

(51) Int. Cl.
*C02F 1/72* (2006.01)
*C02F 1/02* (2006.01)
(52) U.S. Cl. ...................................................... 210/761
(58) Field of Classification Search .................. 210/961,
210/761, 181, 218, 511, 749, 758, 762, 220,
210/760, 207; 201/30, 31, 10; 422/139,
422/140, 145, 147, 184.1, 242, 231; 588/312,
588/313, 320; 423/580.1; 203/28, 31, 38
See application file for complete search history.

(56) References Cited

U.S. PATENT DOCUMENTS 3,322,665 A * 5/1967 Chervenak et al. ............. 208/97
(Continued)

FOREIGN PATENT DOCUMENTS

JP 11-156186 6/1999
(Continued)

OTHER PUBLICATIONS

JP Pub. 2002-226871A, Aug. 14, 2002, (Machine Translation of IDS reference).*

*Primary Examiner* — Lucas Stelling
(74) *Attorney, Agent, or Firm* — Wenderoth, Lind & Ponack, L.L.P.

(57) ABSTRACT

A method of and an apparatus for continuous sub-critical water decomposition treatment for material to be processed containing solid matter are provided, which are capable of controlling decomposition reaction of the material to be processed and suitable for large-scale operations. The method and the apparatus are also capable of minimizing equipment costs and selectively producing desired useful substances at high yield rates.

Material to be processed is grinded in advance into particles, which are mixed with water to prepare slurry. The slurry is sent to a compressing device (1) through a pipe and is compressed. Next, the compressed slurry is sent to a heating device 2 and heated, and is brought into a sub-critical state. The slurry in a sub-critical condition is introduced through an inlet (8) into a bottom part of a reactor (3). In the reactor (3) a fixed bed, a fluidized bed, and a sub-critical water dissolution part are formed in that order from the bottom. One(s) of outlets (101) to 106 provided at top and side portions of the reactor 3 is/are selected so that the sub-critical water dissolution part is taken out therethrough, whereby the residence time of the sub-critical water is adjusted and thus the reaction time of sub-critical water decomposition of the material to be processed is adjusted.

10 Claims, 15 Drawing Sheets

U.S. PATENT DOCUMENTS

| | | | | |
|---|---|---|---|---|
| 3,647,681 A | * | 3/1972 | Egan | 208/111.05 |
| 3,675,434 A | * | 7/1972 | Crawford et al. | 62/630 |
| 3,830,698 A | * | 8/1974 | Kleiss | 203/2 |
| 4,014,786 A | * | 3/1977 | Potter et al. | 210/207 |
| 4,589,927 A | * | 5/1986 | Allen et al. | 422/140 |
| 4,597,773 A | * | 7/1986 | Quintana et al. | 210/634 |
| 5,061,377 A | * | 10/1991 | Lee et al. | 210/752 |
| 5,386,055 A | * | 1/1995 | Lee et al. | 210/761 |
| 5,797,989 A | * | 8/1998 | Geissbuehler et al. | 422/245.1 |
| 6,054,057 A | | 4/2000 | Hazlebeck et al. | |
| 2002/0113024 A1 | * | 8/2002 | Pilz et al. | 210/761 |
| 2003/0189012 A1 | * | 10/2003 | Cansell | 210/761 |

FOREIGN PATENT DOCUMENTS

| | | |
|---|---|---|
| JP | 2000-93926 | 4/2000 |
| JP | 2001-246239 | 9/2001 |
| JP | 2002-226871 | 8/2002 |

* cited by examiner

METHOD OF AND APPARATUS FOR PRODUCING SUB-CRITICAL WATER DECOMPOSITION PRODUCTS

TECHNICAL FIELD OF THE INVENTION

The present invention relates to methods of producing sub-critical water decomposition products, and apparatus for producing sub-critical water decomposition products.

BACKGROUND ART

The use of sub-critical/supercritical water decomposition reactions has been known as a method for recovering useful substances from wastes such as food wastes and wood wastes. For example, there has been a method in which cellulose, starch, and the like contained in a large amount in biomass are subjected to decomposition reactions with sub-critical/supercritical water to decompose them into monosaccharides or oligosaccharides and the decomposed products are then recovered. The resultant monosaccharides and oligosaccharides are further subjected to alcoholic fermentation or methane fermentation to convert them into ethanol and methane gas, which are easier to utilize (cf. Patent Reference 1). In this method, waste such as wood waste is grinded into fine particles in advance, and thereafter the resultant is mixed with water to form a slurry, followed by decomposition reaction with sub-critical water/supercritical water.

In this method, however, the decomposition reaction is difficult to control. If the reaction takes place excessively, the waste will be decomposed into carbon dioxide and water and useful substances cannot be recovered. Conversely, if decomposition is insufficient, a large amount of residue will remain, degrading the process efficiency. It is believed that the reason why the decomposition reaction is difficult to control with this method is that the hydrolysis reaction with sub-critical water proceeds on the surface of the solid components of the waste. For example, in cellulose decomposition with sub-critical water or supercritical water, the decomposition reaction rates of the decomposition products, monosaccharides and oligosaccharides, are faster than the decomposition reaction rate of cellulose itself. For this reason, the monosaccharides and oligosaccharides are decomposed into organic acids, carbon dioxide, or water; or they are carbonized by polymerizing each other.

To resolve this problem, the following method has been proposed (cf. Patent Reference 2). First, cellulose powder is put into a tube furnished with sintered filters with a pore diameter of 5 µm attached to both ends thereof, and while water in a sub-critical condition is being passed continuously therethrough, oligosaccharide is produced on the cellulose powder surface by the decomposition is extracted with the use of sub-critical water. Next, the sub-critical water is taken out of the reactor while being quenched to thereby prevent side reactions, such as decomposition of the oligosaccharide. This method employs, however, a batch-type reaction and is therefore not suitable for large-scale operations. Moreover, a problem is that the pores in the sintered filters tend to be plugged by various reaction products.

Another method that has been proposed involves decomposing and solubilizing electronic appliance scraps, waste plastics, and the like in a fluidized bed with a special shape, using supercritical water, to separate inorganic solid matter, and thereafter, completely decomposing the resultant into gases and mineral salts with a high-pressure reactor (cf. Patent Reference 3). The apparatus used for this method comprises a columnar fluidized bed reactor having a vertical partition wall, and while supercritical water is being pressure-fed from a lower part of the reactor, slurry in which a grinded waste material is dispersed in supercritical water is pressure-fed into the reactor from the top portion thereof. As a result, the waste containing organic components goes down in the reactor, then passes under the vertical division wall, and further flows into the opposite side of the reactor. At this time, the organic components dissolve in the supercritical water and therefore flow out from the top portion of the reactor. To the organic components dissolving in the supercritical water, an oxidizing agent is further added in the high-pressure reactor so as to be completely decomposed into gases, such as carbon dioxide, and mineral salts. The inorganic powder, such as ceramic, that is contained in the waste is discharged from the top portion of the fluidized bed reactor. In this method, organic matter is decomposed and solubilized by supercritical water while waste material is traveling through a predetermined flow path in the fluidized bed reactor. This method uses, as the reaction and extraction solvent, water in a supercritical state, which has a low density, and is therefore suitable for completely decomposing ceramics, waste plastics, and the like, which have a high density, into gases and mineral salts, or isolating inorganic solid substances.

Nevertheless, because organic wastes that contain solid matter with a high water content has a density close to that of supercritical water, this method is problematic when decomposition reactions need to be controlled or when a specific decomposition product needs to be obtained at a high yield rate. Moreover, this method requires a complicated apparatus configuration since supercritical water and organic waste material are pressure-fed through different charging ports to the fluidized bed; for the pressure-feeding, at least two high-pressure pressure-feeding apparatuses (compressing means), which are expensive, are necessary. Furthermore, the material for the reactor needs to be resistant to corrosiveness of supercritical water, and therefore, it is necessary to use expensive materials such as Hastelloy and Inconel as the material for the reactor. This increases the equipment costs.

Another method has been proposed in which mixed slurry of sub-critical water and organic waste is introduced into a pressure-resistant reactor by spraying from the top of the reactor, to thereby treating organic wastes by decomposition (Patent Reference 4). Nevertheless, even with this method, it is difficult to control the decomposition of organic waste material.

[Patent Reference 1]
JP 2001-262162A
[Patent Reference 2]
JP H10-327900A
[Patent Reference 3]
JP 2002-210348A
[Patent Reference 4]
JP 2001-246239A

SUMMARY OF THE INVENTION

Problems to be Solved by the Invention

Accordingly, it is an object of the present invention to provide a method of and an apparatus for continuously producing useful substances efficiently through a sub-critical water decomposition treatment.

It is another object of the present invention to provide, in the field of continuous sub-critical water decomposition treatment for material to be processed containing solid matter, a method of and an apparatus for producing desired useful substances selectively at high yield rate, wherein the decomposition reaction of the material to be processed can be controlled, large-scale operations can be made possible, and the equipment costs can be kept low.

Means to Solve the Problems

The present inventor has studied the mechanism of decomposition of solid matter in sub-critical conditions, and as a result, has reached the following methods and apparatus. Specifically, the present invention is as described below.

Under sub-critical conditions for water, decomposition proceeds violently, although not as violently as under super-critical conditions. When material to be processed supplied from an inlet makes contact with water in a sub-critical condition within a reactor, the decomposition proceeds with time. In other words, molecular degradation proceeds corresponding to residence time. If the material to be processed undergoes decomposition excessively, organic matter is decomposed into carbon dioxide and water, and it will become impossible to recover useful substances that may be obtained during the decomposition process, such as organic acids and amino acids. For this reason, in order to recover useful substances, the liquid containing desired decomposition products needs to be taken out from the reactor at the time when the decomposition proceeds to an appropriate degree and the material to be processed has been decomposed into the desired useful substances. When the liquid that has underwent decomposition to an appropriate decomposition condition is taken out from the reactor and put back from a sub-critical state to a normal state, the dissolving power of the water becomes lower. Consequently, the substances are separated in phases such that the components with less hydrophilicity are in an oil phase while the components with higher hydrophilicity are in a water phase; thus, useful substances can be recovered efficiently.

In the present invention, a liquid containing decomposition products is continuously taken out through one or a plurality of the outlets of the reactor to form a steady or pseudo-steady concentration profiles in the reactor. The residence time of material to be processed is determined from the distance from the inlet and the flow rate. Accordingly, desired useful substances will show concentration profiles corresponding to distance from the inlet. According to the configuration of the present invention, a desired decomposition product is taken out through the outlet provided at a position where the concentration of the desired decomposition product is the highest or close to the highest; therefore, useful substances can be recovered efficiently. There are cases in which the steady concentration profiles are not formed. For example, when decomposing the organic matter adhering to mud or sand, the sand or mud that cannot be decomposed will accumulate in the bottom part of the column as a fixed bed or a fluidized bed. In order to avoid this, a port for removing the solid matter is provided at the bottom of the column so that, if such an event occurs, solid particles can be removed therefrom intermittently.

When the liquid containing decomposition products is removed from the reactor, there will be no sub-critical conditions, so the decomposition ceases. In reality, however, the decomposition continues until the decomposition completely stops. For this reason, it is preferable that the liquid containing the decomposition product be taken out at a position slightly closer to the inlet than the position at which the concentration of the desired useful substance reaches its peak. Also, the outlet is fixed at the optimum position when the same material is decomposed at all times, whereas when different materials are to be processed, the outlet position is determined by considering the amount of outlet, and pressure drop.

The most significant feature of the present invention is that the residence times of both material to be processed and liquid in the reactor can be independently adjusted. In order to sufficiently decompose material to be processed, the organic solid matter in the material can be kept in the reactor until the organic solid matter completely decomposes. If the solid matter is made of organic matter and inorganic matter, such as in the case of bones, it can be kept in the reactor until the organic matter contained in the solid matter completely disappears. The residence time of the liquid in the reactor is controlled only by the flow rate and it is shorter than that of the solid matter. The components in the material to be processed that have been solubilized in the sub-critical water or small molecules, which have been produced by hydrolysis of the organics in the material to be processed, can be prevented from being excessively decomposed or from being carbonized by pyrolysis. In the present invention, as the diameter of the inlet tube of the feed is smaller than that of the reactor, the flow rate in the reactor becomes smaller than that in the inlet tube. Although it depends on the particle diameter of solid matter to be processed, the particles form a fixed bed, a fluidized bed, and a sub-critical water dissolution part (plug flow part) in the reactor by making use of gravitational force and the specific gravity of solid matter. When the particle diameter is reduced by the decomposition, the particle is shifted from fixed bed to fluidized bed and sub-critical water dissolution part in turn. At least the fluidized bed and the sub-critical water dissolution part are formed in that order. In the sub-critical water dissolution part, the traveling distance and the flow rate are adjusted to vary the residence time of the solid matter and the residence time of the sub-critical water from each other so that the degree of decomposition of the components in the material to be processed is adjusted, whereby a target decomposition treatment product is recovered.

Specifically, the solid matter that has been decomposed insufficiently remains in the fixed bed and the fluidized bed and is decomposed with the sub-critical water. On the other hand, the components produced by the decomposition dissolve in the sub-critical water and is within the sub-critical water part. The sub-critical layer flows toward the downstream side of the reactor. Therefore, by adjusting the distance and the flow rate, the duration of the decomposition reaction can be adjusted. When a portion or all of the sub-critical water dissolution part that has flowed at an appropriate distance is taken out from the reactor and the decomposition reaction is stopped, the decomposition does not take place any further, so it is possible to take out a target decomposition product. For example, in the case that the solid matter is not entirely organic matter but is rather composed of inorganic matter containing organic matter, such as in the case of bones, the organic matter in the bones are decomposed and solubilized by sub-critical water, and thereby, the particles are reduced into smaller particles and finally turned into powder of calcium phosphate. During this process, three layers are formed, which are a fixed bed composed of particles having a larger particle size than the minimum fluidization particle size, a fluidized bed composed particles having a smaller particle size than the minimum fluidization particle size, and a sub-critical water dissolution part containing powdered calcium phosphate that has been turned into fine particles and brought to the same flow rate as that of the sub-critical water, that is, into a plug flow state. By adjusting the distance, which the sub-critical water flows through, the degree of decomposition of the organic matter can be adjusted and the target decomposition product can be recovered. It should be noted that even if the organic matter in the bones contains toxic substances or a pathogenic substances, such as pathogenic prions, they can be decomposed during the decomposition process. Moreover, even in the cases that crushed particles themselves become smaller through the sub-critical water decomposition such as in the case of plastics, the fixed bed, the fluidized bed, and the plug flow region are formed as in the foregoing case. This method enables the process to be carried out with a continuous system, which is more efficient than a batch system.

Specific methods and apparatuses of the present invention are as follows.

In accordance with the present invention, a method of producing sub-critical water decomposition products comprises: (1) continuously supplying material to be processed into a reactor through an inlet provided for the reactor, whose interior is kept at a sub-critical condition for water, and (2) continuously taking out a liquid containing a decomposition product through one or a plurality of outlets provided at a different position from the position where the inlet of the reactor is provided, to adjust residence time of the liquid containing the decomposition product in the reactor.

The present invention also provides a method of producing sub-critical water decomposition products comprising: (1) continuously supplying material to be processed into a reactor through an inlet provided for the reactor, whose interior is kept at a sub-critical condition for water, and (2) continuously taking out a liquid containing a decomposition product through one or a plurality of outlets provided at a different position from the position where the inlet of the reactor is provided, to form a desired steady concentration profiles of the decomposition product in the reactor; and (3) taking out the desired decomposition product through, among the one or plurality of outlets, one or more outlet(s) provided at a position where the concentration of the desired decomposition product is high. It should be noted that the term "continuously" here is meant to include the meaning of "intermittently".

The present invention also provides a method of producing sub-critical water decomposition products, comprising: (1) continuously supplying material to be processed that contains solid matter having a slow decomposition rate with sub-critical water and a different specific gravity from that of the sub-critical water, into a vertical-type reactor whose interior is kept at sub-critical conditions for water, through an inlet provided for the reactor; (2) adjusting, with one or a plurality of outlets provided at a position different in height from where the inlet is provided for the reactor, an outlet position from which a liquid containing a decomposition product is let out and an outlet amount thereof, to make a steady flow in the sub-critical water in a steady state, the steady flow flowing in an opposite direction to the direction in which the solid matter sinks or floats up and being slower than the sinking velocity or floating velocity of the solid matter; (3) forming in the steady flow, in the following order from the upstream of the flow, at least a fluidized bed in which the solid matter is decomposed into fine particles by the sub-critical water and the fine particles fluidize in the flow, and a sub-critical water dissolution part in which the material to be processed is turned into further finer particles or completely turned into a soluble material to flow with the sub-critical water; (4) further forming, depending on the type of the material to be processed, a fixed bed in which solid matter stays in a fixed location even with the flow, the fixed bed formed upstream of the fluidized bed; and (5) taking out the liquid containing a desired decomposition product from the sub-critical water dissolution part from the reactor, using one(s) of the one or plurality of outlets.

In addition, the present invention provides a method of producing sub-critical water decomposition products, comprising: (1) causing a mixture of material to be processed containing a solid matter and sub-critical water to flow in sub-critical water in a steady state in an opposite direction to the direction in which the solid matter flows; (2) forming in the flow, in the following order from the upstream of the flow, at least a fluidized bed in which the solid matter is decomposed into fine particles by the sub-critical water and the fine particles fluidize in the flow, and a sub-critical water dissolution part in which the material to be processed is turned into further finer particles or completely turned into a soluble material to flow with the sub-critical water; (3) further forming, depending on the type of the material to be processed, a fixed bed in which solid matter stays in a fixed location even with the flow, the fixed bed formed upstream of the fluidized bed; and (4) adjusting the distance through which the sub-critical water dissolution part flows to vary the residence time of the solid matter and the residence time of the sub-critical water from each other and to adjust the degree of decomposition of the components of the material to be processed that have been made soluble to the sub-critical water, whereby a target decomposition treatment product is obtained.

This configuration is also capable of taking out target decomposition products as with the foregoing method.

In the above-described production method, the solid matter may sink in the mixture being in a steady state, and the flow of the mixture may be in an opposite direction to the gravitational force; alternatively, the solid matter may float about in the mixture in a steady state, and the flow of the mixture may be in a direction of the gravitational force. In the present invention, it is preferable that the flow of the mixture be in an opposite direction to the gravitational force when the solid matter sinks in the mixture being in a steady state. On the other hand, it is preferable that the flow of the mixture be in a direction of the gravitational force when the solid matter floats about in the mixture in a steady state.

In the above-described production method, it is preferable that, in the mixture in a steady state, the flow rate of the mixture be less than the sinking velosity or the floating velocity of the mixture.

The mixture may preferably be slurry.

In the above-described production method, it is preferable that the reaction temperature of the sub-critical water decomposition be within a range of from 130° C. to 374° C., and the reaction pressure be in a range equal to or higher than the saturated water vapor pressure at the reaction temperature.

In the present invention, it is possible to use supercritical water together with sub-critical water, instead of using sub-critical water alone. The reaction temperature of the sub-critical water may have, for example, a temperature of 130° C. to 374° C. and a pressure of 0.3 MPa to 100 MPa, more preferably a temperature of 150° C. to 350° C. and a pressure of 0.5 MPa to 100 MPa, and still more preferably a temperature of 170° C. to 300° C. and a pressure of 0.8 MPa to 100 MPa.

It is preferable that the material to be processed be at least one material selected from food, livestock products, agricultural products, marine products, wood, natural organic matter, plastics, chlorinated organic compounds, rubber, fiber, and wastes thereof, as well as sewage treatment wastes and wastewater treatment wastes.

The above-described methods of producing sub-critical water decomposition products may be carried out using the apparatus as described below.

In accordance with the present invention, an apparatus for sub-critical water decomposition treatment comprises: a reactor configured to decompose material to be processed with sub-critical water; heating means for heating a mixture composed of water and the material to be processed to form and keep a sub-critical condition for water, and compressing means for compressing the mixture; introducing means for introducing the material to be processed into the reactor; an inlet for introducing the material to be processed to the reactor; an outlet for letting out a mixture of a decomposition product and water from the reactor, wherein the outlet is provided at a position or positions different from the position where the inlet is provided, so that the outlet can take up a plurality of positions.

In addition, an apparatus for sub-critical water decomposition treatment according to the present invention may comprise: a vertical-type reactor configured to decompose material to be processed with sub-critical water; heating means for heating a mixture of water and the material to be processed and compressing means for compressing the mixture, to form and keep a sub-critical condition for water; introducing means for introducing the material to be processed into the reactor; an inlet for introducing the material to be processed into the reactor; and an outlet for letting out a mixture of water and a decomposition product from the reactor, wherein: the reactor is arranged substantially vertically; the inlet is provided for at least one of a top end portion or a bottom end portion of the reactor; and the introduced mixture of the material to be processed and the sub-critical water is caused to flow, in the sub-critical water in a steady state, in an opposite direction to the direction in which the solid matter flows, so as to form in the flow, in the following order from the upstream of the flow, at least a fluidized bed in which the solid matter is decomposed into fine particles with the sub-critical water and the fine particles fluidize in the flow, and a sub-critical water dissolution part in which the material to be processed is turned into further finer particles or completely into a soluble material to flow with the sub-critical water, and to further form, depending on the material to be processed, a fixed bed in which solid matter stays in a fixed position even with the flow, the fixed bed being formed upstream of the fluidized bed, and the position of the outlet is adjustable so as to let out the sub-critical water dissolution part and adjust the distance through which the sub-critical water dissolution part flows.

It is preferable that the outlet be formed at a plurality of positions on a sidewall of the reactor along the flow direction. The outlet may be a movable outlet that is continuously movable along the flow direction.

The vertical-type reactor may be provided with monitoring means through which the interior can be visualized. Also, it is preferable that: the vertical-type reactor be a cylindrical vessel; the inlet be circular; and the inner diameter of the inlet be within a range of from $1/5$ times to $1/15$ times the inner diameter of the vertical-type cylindrical vessel.

The above-described apparatus may comprise a plurality of the vertical-type reactors.

The apparatus for sub-critical water decomposition treatment may further comprise a tubular reactor for secondary reaction joined to the outlet of the reactor, and the inner diameter of the tubular reactor for secondary reaction may be within a range of 1 to $1/5$ times the inner diameter of the vertical-type cylindrical vessel.

It is preferable that a plurality of the tubular reactors for secondary reaction are provided, and the tubular reactors for secondary reaction are connected in series and/or in parallel with one another.

It is preferable that the apparatus be furnished with heating and cooling means for controlling the reaction temperature in the tubular reactor for secondary reaction.

The vertical-type reactor may preferably be provided with a back-pressure valve, and the reaction pressure in the vertical-type reactor may be controlled using the back-pressure valve.

A cooling pipe may preferably be provided immediately before the back-pressure valve.

Effects of the Invention

The method of producing sub-critical water decomposition products and the apparatus for sub-critical water decomposition treatment according to the present invention make it possible to freely set the reaction time for solid matter and the reaction time for solubilized material separately by adjusting the residence time of a sub-critical water dissolution part in the reactor. As a result, the decomposition reaction of the material to be processed can be controlled easily. Moreover, the method of producing sub-critical water decomposition products and the apparatus for sub-critical water decomposition treatment according to the present invention are capable of continuously processing material to be processed and are therefore suitable for large-scale operations. Furthermore, sub-critical conditions allow reactions to proceed more gently than supercritical conditions, making it possible to reduce equipment costs. Adjusting the residence time of the sub-critical water dissolution part makes it possible to produce desired useful substances selectively at high yield rates.

DETAILED DESCRIPTION OF THE INVENTION

Material to be Processed

The material to be processed, which may be subjected to the decomposition treatment with the use of the method of producing sub-critical water decomposition products and the apparatus for sub-critical water decomposition treatment according to the present invention, may include: natural organic matter such as livestock products, agricultural products, marine products, wood and plants, and wastes thereof; food and food wastes; synthetic organic substances including plastics and chlorinated organic compound, rubber, fiber, and wastes thereof; as well as sewage treatment wastes and wastewater treatment wastes including activated sludge and excess sludge. These materials to be processed may be in the form of one kind of solid matter or a mixture of several kinds of solid matters. These materials to be processed may contain water therein.

Examples of the material to be processed include such materials as fish iliac bone, squid entrails, scallop viscera wastes, octopus viscera wastes, oyster entrails, and fish waste, which includes bones, bony parts, entrails, and waste meats, such materials as meat, bones, brain, skin, entrails, fat, meat-and-bone meal, and pathogenic prions, which are derived from animals, such as cattle and pigs; such materials as vegetable wastes, corncob, and straws, such materials as wood, bamboo, trunks and skins, sawdust, and waste wood; and such materials as activated sludge, excess sludge, and animal excreta. If the material to be processed contains hard solid matter such as bones, the material to be processed is usually grinded or crushed to conform to the inlet size of the apparatus used, circumstances concerning the pump used for compressing, the pipe line and so forth, or to meet the demands for shorter reaction time, so that the material can then be subjected to sub-critical water decomposition.

It should be noted, however, that the material to be processed used for the method of and the treatment apparatus for producing sub-critical water decomposition products according to the present invention are not restricted to the material to be processed that contains solid matter. For example, the material to be processed may be such liquid that is slightly soluble in sub-critical water, forms a phase in sub-critical water, and can float or sink in sub-critical water. According to the present invention, even with such liquid, it is possible to adjust the reaction time for the liquid and the reaction time of the sub-critical water decomposition products obtained by decomposing the liquid. Moreover, by using the method or apparatus of the present invention, it becomes possible to select appropriate conditions of sub-critical water decomposition reactions even for the material to be processed composed of a liquid dissolved in sub-critical water. As a consequence, the decomposition treatment can be made even for materials to be processed containing only liquid such as PCB (polychlorinated biphenyl). Such material to be processed may be inorganic matter containing organic matter.

Moreover, the material to be processed used in the method of and the treatment apparatus for producing sub-critical water decomposition products according to the present invention may contain inorganic substances that cannot be decomposed with sub-critical water. Examples of such material to be processed include sludge containing stones, sand, or metal fragments, and FRPs (fiber reinforced plastics) containing glass fibers. As will be discussed later, the apparatus of the present invention may employ a vertical-type reactor. The inorganic substances that cannot be decomposed accumulate at the bottom of the reactor. Therefore, the decomposition treatment can be conducted continuously by discharging the inorganic substances that cannot be decomposed, which accumulate at the bottom of the reactor, at appropriate time.

In the present invention, it is preferable that the "solid matter" contained in the material to be processed be a solid matter containing an organic substance. With such solid matter, hydrolysis and pyrolysis with sub-critical water take place at the surface of the solid matter. For this reason, it will take a long time for the solid matter to be completely decomposed. When decomposed with a conventional continuous apparatus, such solid matter has been a cause of clogging. Moreover, in the case that such solid matter is decomposed with a batch apparatus, a solid matter component that is initially dissolved in sub-critical water tends to be carbonized through excessive decomposition or pyrolysis, so it has been impossible to produce target useful substances efficiently.

The density (specific gravity) of the solid matter should be greater than or less than the density of sub-critical water. This is because the decomposition with sub-critical water according to the present invention makes use of sedimentation and floating of the solid matter contained in the mixture of material to be processed and sub-critical water.

[Method of Producing Sub-critical Water Decomposition Products]

It is preferable that the method of producing sub-critical water decomposition products according to the present invention be conducted using an apparatus for sub-critical water decomposition treatment according to the present invention. Accordingly, hereinbelow, the method of producing sub-critical water decomposition products will be explained along with the description of the apparatus.

Apparatus for Sub-critical Water Decomposition Treatment

Embodiment 1

FIG. 1 is a schematic block diagram illustrating one example of the reaction apparatus according to Embodiment 1 of the present invention. As illustrated in this figure, this apparatus comprises a reactor 3, a compressing means 1, a heating means 2, a cooling pipe 4, a back-pressure valve 5, a reaction-completed-product recovery tank 6, and an effluent recovery tank 7. In the apparatus of FIG. 1, the compressing means 1 also serves as a mixture introducing means at the same time. The reactor 3 is of vertical type and in cylindrical tubular form, and is arranged substantially vertically. An inlet 8 and a discharge outlet 9 are provided at a bottom portion of the reactor 3. The compressing means 1 and the heating means 2 are connected to the just-mentioned inlet 8 by a piping. The inlet 8 is connected to the effluent recovery tank 7 via the cooling pipe and a back-pressure valve 11. The reactor 3 is provided with outlets on its head portion and its sidewall. In the example shown in FIG. 1, eight outlets 101 to 106 are provided in total. The outlets 101 to 106 are connected to the reaction-completed-product recovery tank 6 via respective valves.

The decomposition treatment for material to be processed with the apparatus of FIG. 1 may be carried out, for example, in the following manner. First, material to be processed is grinded into particles in advance and mixed with water to prepare slurry. The slurry is sent through a pipe to the compressing means 1, and is compressed. Next, the compressed slurry is sent to the heating means 2 and heated, whereby it is turned into a sub-critical state. The slurry in the sub-critical state is introduced to a bottom portion of the reactor 3 through the inlet 8. In the reactor 3, a fixed bed, a fluidized bed, and a sub-critical water dissolution part are formed in that order from the bottom. The sub-critical water dissolution part is taken out from one(s) of the discharge outlets 101 to 106 provided at the top and the sidewall of the reactor 3. The sub-critical water dissolution part that has been taken out is passed through the cooling pipe 4 and the back-pressure valve 5, and is recovered in the reaction-completed-product recovery tank 6.

Heating Means and Pressurizing Means

The heating means 1 may be any known heating means without any particular limitations. Examples include an electric heater, an inductive heating apparatus, and heating using thermal oil or water vapor. The compressing means 2 may be a pressure pump, for example.

Introducing Means

The introducing means is a means for introducing a mixture of water and material to be processed into the reactor 3. The introducing means may be, but is not particularly limited to, a high-pressure pressure feeding apparatus. In the present invention, it is preferable that a mixture of material to be processed and sub-critical water be introduced into the reactor in the form of slurry. This enables the compressing means 1 to also serve as the introducing means. As a consequence, only one high-pressure pressure feeding apparatus (compressing means), which is costly, is necessary, and thus, it is possible to minimize equipment costs. When the compressing means 1 is used also as the introducing means, the material to be processed is introduced into the reactor 3, for example, in the following manner. The solid matter in the material to be processed that has been grinded into fine particles in advance is mixed with water and is made into a slurry state. Next, the mixture in slurry state is heated by the heating means 1 and is thereafter introduced through the inlet 8 into the reactor 3 by the compressing means 2. The apparatus for sub-critical water decomposition treatment according to the present invention may further have grinding means for grinding solid matter in material to be processed into fine particles.

It is preferable that the apparatus of the present invention conduct decomposition of material to be processed using sub-critical water. Supercritical water is a good reaction solvent because it is a stronger oxidant and has a greater diffusion coefficient than liquid water. However, supercritical water decomposes almost all the material to be processed to carbon dioxide. Although sub-critical water is a weaker oxidant than supercritical water, it possesses sufficient hydrolyzability and sufficient extractability for oils and fatty acids in order to obtain useful substances. Moreover, sub-critical water is less corrosive to metals etc. than supercritical water. As a result, the material for the reactor does not need to be expensive materials, such as Hastelloy and Inconel, but may be low cost materials such as mild steel (carbon steel), which is generally used for common pressure vessels. Even under relatively highly corrosive conditions such as those generated by organic acids, it is possible to use materials such as SUS316 that are far less costly than such materials as Hastelloy and Inconel. In the present invention it is also possible to use sub-critical water and supercritical water in combination, as necessary. Moreover, the sub-critical water may be made by adding an acid or alcohol to water.

Reactor

In the apparatus of the present invention, the shape of the reactor 3 is not particularly restricted; however, it is preferable that the shape of the reactor 3 be in a cylindrical shape. At least one of the top end and the bottom end of the reactor 3 is provided with the inlet 8. The material to be processed such as slurry is introduced into the interior of the reactor through the inlet 8. The inner diameter of the inlet 8 may be in the range of from $1/5$ times to $1/15$ times the inner diameter of the vertical-type cylindrical vessels, as mentioned above. When the inner diameter of the inlet 8 is within the foregoing range, the flow rate of the material to be processed in the reactor 3 can be controlled as described below. For example, when the slurry is introduced into the reactor 3 through the inlet 8 at a flow rate equal to or faster than the transport velocity, the flow rate of the slurry introduced into the reactor becomes slower since the inner diameter of the interior of the reactor 3 is greater than the inner diameter of the inlet. As a consequence, the flow rate of the slurry is adjusted to a flow rate equal to or faster than the minimum fluidization velocity (transport velocity) of particles, and therefore, a solid-liquid fluidized bed can be formed in the reactor 3. Herein, the term "transport velocity" means a velocity of the particles that sink or float up in a steady fluid as described above. When the sub-critical water flows in the reactor 3 at a flow rate higher than the transport velocity, all the solid matter contained in the material to be processed also flows along the flow of the sub-critical water. As a result, there will be no difference in reaction time between the solid matter and the dissolved substances in the sub-critical water. When the sub-critical water flows in the reactor 3 at a flow rate lower than the minimum fluidization velocity, the solid matter does not flow, forming a fixed bed. When the sub-critical water flows in the reactor 3 at a flow rate higher than the minimum fluidization velocity, the solid matter forms a fluidized bed. In other words, the solid-liquid fluidized bed is formed.

In the case that a large amount of unreacted solid matter with a relatively large particle size exists in the reactor 3, a fixed bed state (fixed bed) forms in a portion of the reactor at the top end or bottom end where the inlet is provided. The unreacted solid matter with a relatively large particle size gradually undergoes the reaction with sub-critical water, and its particle size becomes smaller. The particles with a smaller particle size flow toward the downstream side of the reactor due to the flow of the sub-critical water, forming a solid-liquid fluidized bed (fluidized bed). The useful substances produced by the decomposition reaction with the sub-critical water dissolve into the sub-critical water and flow toward the downstream side of the reactor 3, forming a plug flow (sub-critical water dissolution part). It is possible to provide a means for stirring and crushing the solid matter that forms the fixed bed in the inlet side of the reactor 3. This serves to conduct the decomposition reaction more efficiently.

The outlet may be provided at a different position from the position where the inlet 8 is provided. The outlet may take up a plurality of positions downstream of the position where the inlet is provided. In the example shown in FIG. 1, the outlets are formed along the flow direction and at a plurality of positions (101 to 108) on the sidewall of the reactor. By providing a plurality of outlets in this way, the plug flow can be taken out of the reactor 3. Specifically, the positions of the outlets should preferably be determined according to the residence time of the material to be processed dissolved in the sub-critical water, in other words, according to the decomposition time of the material to be processed components in the sub-critical water, along the flow direction of the sub-critical water in the reactor 3. In the example of FIG. 1, any one(s) of the outlets (101 to 108) formed at a plurality of positions may be selected to take out the plug flow. Thus, it is possible to adjust sub-critical water decomposition reaction time by selecting which of the outlets should be used to take out the plug flow.

The positions of the inlet 8 and the outlet(s) provided for the reactor 3 are determined based on the density of the solid matter in the material to be processed and the density of sub-critical water. For example, if the density of the solid matter in the material to be processed introduced is greater than the density of sub-critical water, the inlet 8 should be arranged at the bottom end of the reactor 3 and the outlet(s) should be higher than the position where the inlet is provided. Conversely, the density of the solid matter in the material to be processed introduced is less than the density of sub-critical water, the inlet 8 should be arranged at the top end of the reactor 3 and the outlet(s) should be lower than the position where the inlet is provided. Alternatively, if the solid matter in the material to be processed is a mixture of a substance with a higher density and a substance with a lower density than the density of sub-critical water, two inlets 8 may be provided both at the top and bottom ends of the reactor 3. In this case, it is possible to take out the sub-critical water dissolution part either through the outlets provided at two respective desired positions with respect to the bottom end or through the same one outlet. Further, if the solid matter of the material to be processed contains a small amount of solid substance having a smaller density than sub-critical water, the inlet may be provided for only the bottom end of the reactor, and one or more filters for preventing the solid substance having a smaller density from floating about may be provided in the reactor.

The solid matter in the material to be processed stays in the fixed bed or the solid-liquid fluidized bed, and it is decomposed from the surface of the solid matter by sub-critical water. When the solid matter is composed of inorganic matter containing organic matter, such as in the case of bones, the organic matter in the bones is decomposed and solubilized by sub-critical water, and thereby the solid matter is finally turned into powder of calcium phosphate as the particles of the bones are reduced into smaller particles. During the process of the decomposition, three layers are formed in the reactor; the three layers are, namely, a fixed bed composed of particles larger than the minimum fluidization particle size, a fluidized bed composed of smaller than the minimum fluidization particle size, and a sub-critical water dissolution part in which powdered calcium phosphate is turned into further finer powder and brought to the same flow rate as that of sub-critical water, in other words, brought into a plug flow state. By adjusting the distance, which the sub-critical water flows through, the degree of decomposition of the organic matter can be adjusted in the sub-critical water dissolution part, whereby the target decomposition product can be recovered. Even if the organic matter in the bones contains toxic substances and pathogenic substances such as pathogenic prions (abnormal prions), they can be decomposed and detoxified by the process of the just-mentioned decomposition treatment.

In the case that the slurry is pressure fed through piping to the reactor 3, it is preferable that the flow rate of the slurry be equal to or greater than the transport velocity of the solid matter. This is because if the flow rate in the pressure feeding through piping is less than the transport velocity, the solid components contained in the slurry sediment in the bottom part of the piping, causing plugging of the pipe.

The density and viscosity of sub-critical water are 887 kg/m$^3$ and 0.541 kg/m·hr, respectively, at 178° C. (1 MPa saturated water); 778 kg/m$^3$ and 0.359 kg/m·hr, respectively, at 364° C. (5 MPa saturated water); and 688 kg/m$^3$, 0.294 kg/m·hr, respectively, at 311° C. (10 MPa saturated water). For example, the density of wood flour in which sub-critical water is permeated is about 1000 kg/m$^3$, so a fluidized bed can be formed by causing sub-critical water to flow at an appropriate flow rate.

When the density of the solid matter contained in the material to be processed is higher than the density of sub-critical water, the transport velocity can be calculated from the relationship between the solid matter and its particle size based on the physical properties of sub-critical water. The minimum fluidization velocity (Umf) can be determined from Wen's formula. On the other hand, the transport velocity (Ut) is determined from the fluid resistance formula. The minimum fluidization velocity (Umf) is a flow rate at which the fluid resistance that acts on particles matches the gravitational force. By pressure-feeding sub-critical water at a flow flow rate higher than the minimum fluidization velocity (Umf), a solid-liquid fluidized bed can be formed. When pressure-feeding sub-critical water at a flow rate higher than the transport flow rate (Ut), solid matter flows out from the outlet(s) of the reactor, as described above.

Table 1 below shows minimum fluidization velocities (Umf), transport velocities (Ut), and the ratios (Ut/Umf) of particles with various particle sizes (mm), calculated for 1 MPa, 5 MPa, and 10 MPa saturated waters, when the true specific gravity of solid particles (solid matter) is 1500 kg/m$^3$.

TABLE 1

| True specific gravity of solid matter kg/m$^3$ | Saturation pressure MPa | Temperature C.° | Particle size mm | Umf m/s | Ut m/s | Ut/Umf — |
|---|---|---|---|---|---|---|
| 1500 | 1 | 180 | 0.05 | 0.00007 | 0.006 | 74.1 |
|  |  |  | 0.1 | 0.00030 | 0.017 | 56.0 |
|  |  |  | 1 | 0.01187 | 0.143 | 12.0 |
|  | 5 | 264 | 0.05 | 0.00013 | 0.011 | 84.2 |
|  |  |  | 0.1 | 0.00053 | 0.022 | 42.2 |
|  |  |  | 1 | 0.00154 | 0.165 | 10.7 |
|  | 10 | 311 | 0.05 | 0.00018 | 0.013 | 74.0 |
|  |  |  | 0.1 | 0.00073 | 0.027 | 37.0 |
|  |  |  | 1 | 0.0181 | 0.186 | 10.3 |

It will be appreciated from Table 1 that, by grinding the solid matter contained in the material to be processed subjected to hydrolysis to an appropriate size to thereby form slurry, the solid matter can be transported at a sufficient flow rate that does not cause sedimentation during the transport, and the slurry can be heated, while a sufficient fluidization state of the slurry can be obtained in the reactor. For example, in the case that the slurry of material to be processed having a particle size of 0.1 mm is caused to react with 5 MPa saturated water, the transport velocity (Ut) is 0.022 m/s. This means that if the slurry is transported at 10 times the flow rate, at 0.22 m/s, the slurry can be transported sufficiently and can be heated. When the slurry is introduced into a reactor having an inner diameter of 10 times the inner diameter of the inlet, the superficial velocity is 1/100. As a consequence, the superficial velocity of the sub-critical water in the solid-liquid fluidized bed is 0.0022 m/s, which means that a solid-liquid fluidized bed with a velocity of about 4 times the minimum fluidization velocity (Umf) can be formed. Here, the term "superficial velocity" means the velocity at which the sub-critical water fluid flows in the reactor 3.

As clearly seen from Table 1, minimum fluidization velocity (Umf) and transport velocity (Ut) of solid particle vary according to the particle size of the solid particle. The larger the particle size is, the greater the minimum fluidization velocity (Umf) and the transport velocity (Ut) will be. Therefore, when grained materials of material to be processed having different particle sizes are caused to flow upward in the reactor 3 at a certain superficial velocity, a solid matter with a larger particle size does not form a solid-liquid fluidized bed but rather forms a fixed bed at the bottom of the interior of the reactor 3. Although the solid matter with a large particle size temporarily forms a fixed bed, it flows upward in the reactor 3, forming a solid-liquid fluidized bed, when it undergoes a hydrolysis reaction with sub-critical water and its particle size becomes smaller as the decomposition product dissolves away from the surface of the solid matter. It should be noted, however, that, in the case that the sub-critical water decomposition is conducted for the to be processed material containing solid matter components in which their particle sizes and true specific gravities are relatively uniform, there may be a case in which no fixed bed (fixed layer) is formed if the particle sizes are smaller than the minimum fluidization particle size.

As described above, in the present invention, solid-liquid ratio and reaction time can be controlled over a wide range by controlling the density, the particle size, and the reaction temperature of the reactant solid matter. The flow rate can be controlled, for example, by the compressing means or the introducing means. For example, in the case of using a pressure pump, the flow rate can be adjusted by the number of revolution thereof.

It should be noted that, although not shown in FIG. 1, it is preferable that the reactor 3 according to the present invention be provided with a monitoring means with which the interior of the reactor 3 can be observed. Examples of the monitoring means include, but are not particularly limited to, provision of a window in a reactor sidewall and provision of a camera. When a window is provided, another window for lighting may also be provided in combination. In addition, if a camera is used, a lighting device may be provided as needed. By providing a monitoring means in this way, it becomes possible to observe such conditions as colors, particle sizes, and turbidity of the mixture, length of the fixed bed, and length and flow conditions of the fluidized bed in the reactor, in order to confirm whether or not the reaction is underway as intended. The number of monitoring means provided is not particularly restricted, and for example, monitoring means may be provided from the top to the bottom of the reactor 3 at regular intervals. In particular, if a plurality of outlets is provided on the sidewall of the reactor 3, respective monitoring means may be provided corresponding to the outlets.

It is also possible to provide a discharge outlet 9 at the bottom of the reactor 3. The density of inorganic matter or carbide, contained in to be processed material, that does not dissolve in the sub-critical water is greater than the density of organic solid matter. By providing the discharge outlet 9 at the bottom of the reactor 3, inorganic substances, carbides, and the like that sink in the bottom portion can be discharged easily through the discharge outlet 9.

In the present invention, the reaction temperature in the reactor 3 is adjusted by the heating means. It is preferable that the temperature be within a range of from 130° C. to 374° C., more preferably from 150° C. to 350° C., and still more preferably from 170° C. to 300° C. If the reaction temperature is 150° C. or higher, the reaction time will not take too long. Also, if the reaction time is 300° C. or lower, the decomposition reaction does not proceed excessively, and moreover, it is possible to prevent the reactor 3 from corroding. Furthermore, a heating and thermal-insulating device may be provided on the outer periphery of the reactor for the purpose of, for example, keeping the temperatures. Further, a safety means such as a relief valve may also be provided.

In the apparatus for producing sub-critical water decomposition products of the present invention, the decomposition reaction is conducted at relatively low temperatures as long as the reaction time does not become extremely long. The reason is that this prevents pyrolysis of useful substances, and reduces running costs. For example, in cases in which starch contained in leftover food in a large amount is hydrolyzed to obtain glucose and oligosaccharides, the hydrolysis should preferably be carried out at 150° C. to 220° C. This is because starch tends to undergo hydrolysis relatively easily and cause carbonization easily by pyrolysis. In another example, in cases in which the cellulose contained in bean curd lees is hydrolyzed to obtain glucose and oligosaccharides, it is preferable that the hydrolysis be carried out at 170° C. to 250° C. This is because cellulose shows a slower rate of hydrolysis than starch. In yet another example, in cases where proteins contained in fish waste is hydrolyzed to extract and recover amino acids, organic acids, and oil at the same time, it is preferable that the hydrolysis be carried out at 150° C. to 250° C.

In the present invention, the catalysts that are generally used for sub-critical water decomposition may be used in order to promote reactions and suppress pyrolysis. Usable examples of the catalysts include: acid catalysts such as sulfuric acid, hydrochloric acid, and phosphoric acid; alkali catalysts such as sodium hydroxide sodium carbonate; metal oxide-based catalysts such as manganese oxide and copper oxide; rare-earth oxide-based catalysts such as rhodium, ruthenium, and palladium; noble metal catalysts such as gold and platinum. The method of adding catalysts is not particularly restricted; for example, a catalyst may be added to slurry in advance.

In the apparatus of the present invention, the reaction pressure may be controlled by adjusting opening of the back-pressure valve 11. It is also possible to provide a cooling pipe 10 immediately before the back-pressure valve 11. By providing the cooling pipe 10, a reaction completed product can safely be recovered in the reaction-completed-product recovery tank or the like. In the reaction-completed-product recovery tank, when the target product is a water-soluble substance, such as oligosaccharides, monosaccharides, amino acids, organic acids, or peptides, the target product is recovered in the state in which it is dissolved in water, whereas when the target product is a water-insoluble substance such as oil or fat, it is recovered in the state in which it retains on top of aqueous solution.

A sub-critical water decomposition product produced using a method according to the present invention can be recovered from, for example, the just-mentioned reaction completed product. The reaction completed product is a mixture containing an aqueous phase, an oil phase, and a solid phase. These phases can be separated through spontaneous separation, centrifugation, or the like. The kinds of decomposition treatment products obtained vary depending on temperature, pressure, reaction time, or types of materials to be processed.

For example, when the material to be processed is, for example, bones, meat and the like originating from cattle, the aqueous phase contains organic acids, phosphoric acids, amino acids, ammonia, sugar, etc. Examples of the organic acids that may be obtained include lower fatty acids (those with carboxyl groups) such as pyroglutamic acid, lactic acid, acetic acid, formic acid, succinic acid, pyruvic acid, and propionic acid. Examples of the amino acids that may be obtained include histidine, glycin, alanine, glutamic acid, aspartic acid, leucine, isoleucine, phenylalanine, valine, and taurine. Examples of the sugars that may be obtained include glucose and fructose. In addition, the oil phase contains fatty acids etc. Examples of the fatty acids include oleic acid, palmitic acid, stearic acid, and palmitoleic acid. Further, the solid phase contains calcium phosphate etc. originating from the bones.

Alternatively, for example, when the material to be processed originates from wood, the aqueous phase contains organic acids, sugars, and the like. Examples of the organic acids that may be obtained include glycolic acid, lactic acid, acetic acid, formic acid, levulinic acid, propionic acid, malic acid, and succinic acid. Examples of the sugars that may be obtained include cellotriose (a substance in which three glucose molecules are bonded), cellobiose (a substance in which two glucose molecules are bonded), glucose, fructose, and erythrose (a decomposition product of glucose). The oil phase contains, for example, tar-like oily substances. The solid phase contains, for example, low-density porous carbon materials.

Furthermore, for example, when the material to be processed originates from mollusk, such as in the case of wastes originating from scallop, the aqueous phase contains organic acids, phosphoric acids, and amino acids. Examples of the organic acids that may be obtained include pyroglutamic acid, lactic acid, acetic acid, formic acid, succinic acid, and pyruvic acid. The oil phase contains, for example, fatty acids. Examples of the fatty acids that may be obtained include eicosapentaenoic acid (EPA), docosahexaenoic acid (DHA), oleic acid, palmitic acid, palmitoleic acid, myristic acid, stearic acid, eicosenoic acid, and docosenoic acid.

The methods for separating the above-mentioned respective decomposition products are not particularly restricted, and various known methods may be employed. For example, examples of the method for separating each of the decomposition products from the aqueous phase include ion exchange methods, membrane separation methods, crystallization methods, and combined processes thereof. Also, the method for separating each of the decomposition products from the oil phase may include, for example, vacuum distillation.

Embodiment 2

In Embodiment 2, the reaction apparatus of Embodiment 1 is further provided with reactors for secondary reaction. FIG.

2 is a schematic block diagram for illustrating another embodiment of the apparatus for sub-critical water decomposition product according to the present invention. In FIG. 2, the same parts as those in FIG. 1 are designated by the same reference numerals. As illustrated in FIG. 2, the 12 are connected to the outlet 101 of the reactor 3 via pipes. The reactors for secondary reaction 12 are connected to one another via pipes. Each of the pipes are provided with a switching valve. The reactors for secondary reaction 12 can be freely connected either in series or in parallel with one another by switching with the valves. These reactors for secondary reaction 12 are connected to a cooling pipe by a pipe and further connected to a back-pressure valve 5. A reaction-completed-product recovery tank 6 is disposed following the back-pressure valve 5. In the example shown in this drawing, monitoring means 13 are provided on the sidewall of the reactor 3.

As with the present embodiment, the apparatus of the present invention may be equipped with, in addition to the reactor 3, the reactors for secondary reaction 12 connected via the outlets 101 to 108 to the reactor 3. This configuration allows the decomposition reactions with sub-critical water to be conducted for a longer time. A preferable example of the reactor for secondary reaction 12 is a tubular reactor for secondary reaction.

It is preferable that the reactors for secondary reaction 12 have a heating means. In addition, it is preferable that the inlet pipe and outlet pipe connected to each of the reactors for secondary reaction have respective switching valves.

It is also possible that the reactor 3 and the reactors for secondary reaction 12 are connected in series and their flow rates are adjusted by one compressing means. In this case, it is preferable not to vary the reaction pressures and reaction temperatures widely between the reactor 3 and the reactors for secondary reaction 12, in order to prevent boiling in the reactor. Accordingly, in the reactors for secondary reaction 12, the degree to which the reaction proceeds is dependent on the flow rate of sub-critical water, in other words, the inner diameter of the reactors for secondary reaction 12, and the residence time is dependent on the length of the reactors for secondary reaction 12.

The degree to which the reaction proceeds for the liquid phase is dependent on the type of material to be processed and reaction temperature. In order to keep the degree to which the reaction proceeds for the liquid phase appropriate, the inner diameter of the reactors for secondary reaction 12 should be 1 to ⅕ times the inner diameter of the reactor 3.

In order to lengthen the reaction time, it is possible to connect a plurality of reactors for secondary reaction 12 in series or parallel using joint pipes. By connecting the reactors in this way, appropriate residence time is ensured. In addition, the joint pipes may be provided with switching valves. By appropriately opening or closing the switching valves, it is possible to select which of the reactors for secondary reaction to be used to control the reaction time.

The reactors for secondary reaction 12 are connected to the reactor 3. For this reason, in order to make the reaction temperatures in both reactors approximately equal to each other, it is preferable that the temperature of the reactors for secondary reaction 12 be adjusted. It is preferable that the reactors for secondary reaction 12 be cooled to approximately the same temperature as the reaction temperature in the reactor 3 if exothermic transitions occurs due to hydrolysis reactions or the like. On the other hand, it is preferable that the reactors for secondary reaction 12 be heated to approximately the same temperature as the reaction temperature in the reactor 3 if an endothermic reaction or heat radiation occurs.

When the reaction temperature in the reactors for secondary reaction 12 becomes 150° C. or lower, for example, the reaction rate of hydrolysis etc. becomes slow. This may in some cases necessitate lengthening of the reactors for secondary reaction 12 considerably. On the other hand, if the reaction temperature exceeds 300° C., the thermal decomposition reaction rate of hydrolysate becomes great. Consequently, it may become difficult to recover target products at high yield rates, and moreover the reactors for secondary reaction 12 may corrode.

When the previously mentioned catalysts are used only for the reactors for secondary reaction 12, an inlet for introducing catalyst may be provided in the introduction joint pipe for the reactors for secondary reaction 12 so that the catalysts can be put in therefrom.

The apparatus according to Embodiment 2 is effective when a reaction completed product taken out from the reactor 3 requires further decomposition. The sub-critical water decomposition product taken out through one(s) of the outlets 101 provided for the reactor 3 is introduced via the pipes to the reactors for secondary reaction 12. In the example of FIG. 2, the number of the reactors for secondary reaction 12 provided is four. These reactors for secondary reaction 12 can be connected either in series or in parallel with one another by varying combinations of the opening/closing of the switching valves coupled thereto. By varying the combinations of the connections, the decomposition reaction can be adjusted. The decomposition product obtained in the reactor for secondary reaction 12 is sent from the reactors for secondary reaction 12 through pipes, then passed through the cooling pipe 4 and the back-pressure valve 5, and is recovered in the reaction-completed-product recovery tank 6. Here, the back-pressure valve 5 is for adjusting the pressures in both the reactor 3 and the reactors for secondary reaction 12, or the pressure in one of the reactor 3 or the reactors for secondary reaction 12. The unreacted substances accumulated in the bottom part of the reactor 3 is recovered in the effluent recovery tank 7 through the discharge outlet 9, the cooling pipe 10, and the back-pressure valve 11.

Embodiment 3

FIG. 3 is a schematic block diagram for illustrating another example of the apparatus for sub-critical water decomposition treatment according to the present invention. In FIG. 3, the same parts as those shown in FIG. 1 are designated by the same reference numerals. As illustrated in FIG. 3, the apparatus of the present embodiment is provided with an outlet that is continuously movable along the flow direction of the sub-critical water in the reactor 3.

The movable outlet comprises a flexible pipe 14, an intake port 15 that is arranged at the fore-end of the flexible pipe 14, for taking in a desired sub-critical water dissolution part, a chain 16 for hanging the flexible pipe 14, and an intra-bath wheel 17 that is capable of winding up or reeling out the chain 16. By adjusting the length of the chain 16, the intake port 15 can be fixed to a desired position.

In the example shown in this figure, the flexible pipe 14 is configured to be inserted from the top end of the reactor 3, but it is also possible to adopt a configuration in which the pipe 14 is inserted from the bottom end of the reactor 3.

Embodiment 4

FIG. 4 is a schematic block diagram for illustrating yet another embodiment of the apparatus for sub-critical water decomposition treatment according to the present invention. In FIG. 4, the same parts as those shown in FIG. 1 are designated by the same reference numerals. As illustrated in FIG. 4, the reactor 3 is connected to a reactor for secondary reaction 12 through one(s) of the outlets 101 to 108 by piping. The reactor for secondary reaction 12 is furnished with three outlets 201 to 203. The outlets 201 to 203 are connected to reaction-completed-product recovery tanks 6 independently from one another, via cooling pipes 4 and back-pressure valves 5. This configuration makes it possible to recover target phases from the plurality of the outlets provided for the reactor for secondary reaction 12 even when the sub-critical water dissolution part taken out from the reactor 3 and introduced into the reactor for secondary reaction 12 forms layers corresponding to the aqueous phase, the oil phase, the solid phase, etc. due to a temperature drop.

Example 1

Hereinbelow, the present invention will be described in more detail with examples thereof. It should be noted that the present invention is not limited to the following examples in any way.

Example 1

A sub-critical water treatment of fish waste (material obtained by mincing dotted gizzard shad [Konosirus punctatus]) was conducted using an apparatus for sub-critical water decomposition treatment as shown in FIG. 1. The inner diameter of the inlet 8 was 15 mm, the inner diameter of the reactor 3 was 128 mm, and the height thereof was 3 m. Here, the inner diameter of the inlet 49 is about ⅛ times the inner diameter of the reactor 3. Two processes were conducted at reaction temperatures of 200° C. and 260° C., respectively, with the flow rate being set at 1 liter/min. The results for the process at a reaction temperature of 200° C. are shown in the graphs of FIGS. 5 and 6, while the results for the process at a reaction temperature 260° C. are shown in the graphs of FIGS. 8 and 9. The vertical axis of the graph of FIG. 5 represents yield rates (kg/kg—dry feed) of various phases. The vertical axes of the graphs of FIGS. 6 to 9 represent yield rates (kg/kg—dry feed) of various substances in the aqueous phase. The horizontal axes of FIGS. 5 to 9 represent residence time (reaction time) in the reactor 3. Residence time (reaction time) in the reactor 3 was varied by selecting one of the plurality of outlets 101 to 107 provided along the height of the reactor 3. The residence time (reaction time) at each of the positions of the outlets 101 to 107 is shown above the horizontal axis in each of FIGS. 5 to 9. The abbreviations of amino acids in FIGS. 7 and 9 are as follows.

| ASP | aspartic acid |
|---|---|
| THR | threonine |
| SER | serine |
| GLU | glutamic acid |
| PRO | proline |
| GLY | glycin |
| ALA | alanine |
| CYS | cystine |
| VAL | valine |
| MET | methionine |
| ILE | isoleucine |
| LUE | leucine |
| TYR | tyrosine |
| PHE | phenylalanine |
| LYS | lysine |
| HIS | histidine |
| ARG | arginine |

Example 2

A sub-critical water treatment of excess sludge of activated sludge was conducted using an apparatus for sub-critical water decomposition treatment as shown in FIG. 1. The inner diameter of the inlet 8 was 15 mm, the inner diameter of the reactor 3 was 128 mm, and the height thereof was 3 m. Here, the inner diameter of the inlet 49 is about ⅛ times the inner diameter of the reactor 3. The processes were conducted at three varying reaction temperatures of 160° C., 200° C., and 240° C., respectively, with the flow rate being set at 1 liter/min. The results for the process at a reaction temperature of 160° C. are shown in the graphs of FIGS. 10 and 11, the results for the process at a reaction temperature of 200° C. in the graphs of FIGS. 12 and 13, and the results for the process at a reaction temperature 240° C. in the graphs of FIGS. 14 and 15. In FIGS. 10 to 15, the vertical axes represent yield rate (kg/kg—dry feed) of the aqueous phase, and the horizontal axes represent residence time (reaction time) in the reactor 3. Residence time (reaction time) in the reactor 3 was varied by selecting one of the plurality of outlets 101 to 107 provided along the height of the reactor 3. The residence time (reaction time) at each of the positions of the outlets 101 to 107 is shown above the horizontal axis in each of FIGS. 10 to 15. The abbreviations of amino acids in FIGS. 11, 13, and 15 are the same as in FIGS. 7 and 0 in Example 1.

As shown in FIG. 5, in the sub-critical water decomposition treatment of fish waste at 200° C., the yield rate of residue solid is 0.05 (kg/kg—dry feed) or less even at the outlet 107, where the reaction time is shortest. The yield rate of residue solid shows almost no change as the residence time increases. This is because the fish waste was sufficiently decomposed and only calcium phosphate remained. In addition, it will be appreciated as shown in FIG. 11 that when, for example, the sub-critical water decomposition treatment of excess sludge of activated sludge is carried out at 160° C., methionine can be recovered at a high yield rate by selecting the outlet 103.

INDUSTRIAL APPLICABILITY

As will be appreciated from the foregoing, the present invention makes it possible to recycle, for example, wastes that are otherwise incinerated, as resources. As a consequence, the present invention is useful for establishing environmental resource management techniques and "zero emission" technology development. Moreover, the present invention makes it possible to recycle useful substances contained in wastes, such as organic acids and amino acids, as resources. Furthermore, if the organic acids such as acetic acid are used as the source material for methane fermentation, fast and highly digestible methane fermentation is made possible, and they can be turned into energy highly efficiently. Furthermore, according to the present invention, even meat-and-bone meal and the like, which may contain pathogenic prions (abnormal prions) or the like, can be detoxified and recycled as resources. Thus, the present invention is also useful for environmental cleanup and the like. In addition, the present invention makes it possible to produce useful sub-critical water decomposition products even from organic materials other than wastes.

Figure 1:
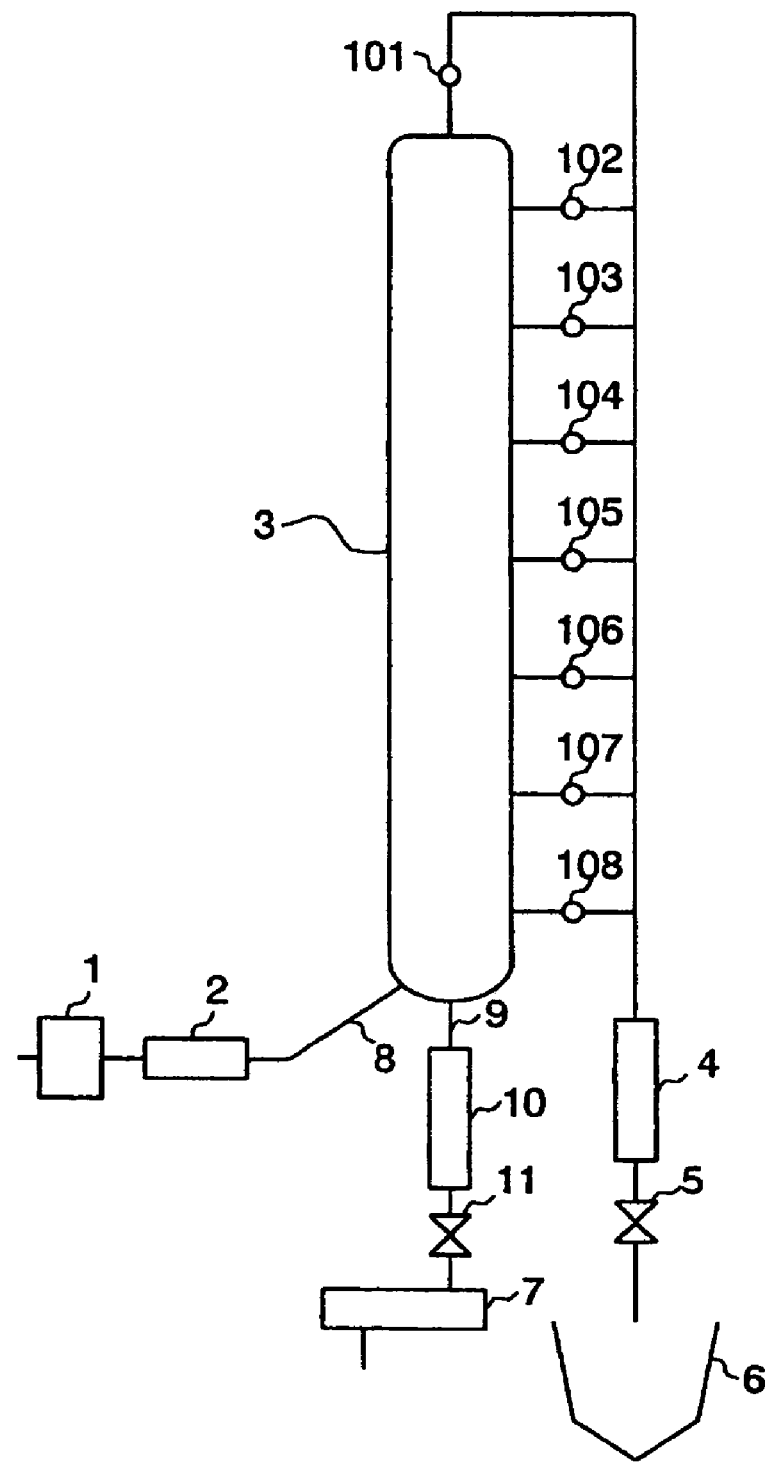
FIG. 1 is a schematic block diagram for illustrating one example of a sub-critical water decomposition apparatus according to the present invention.
Figure 2:
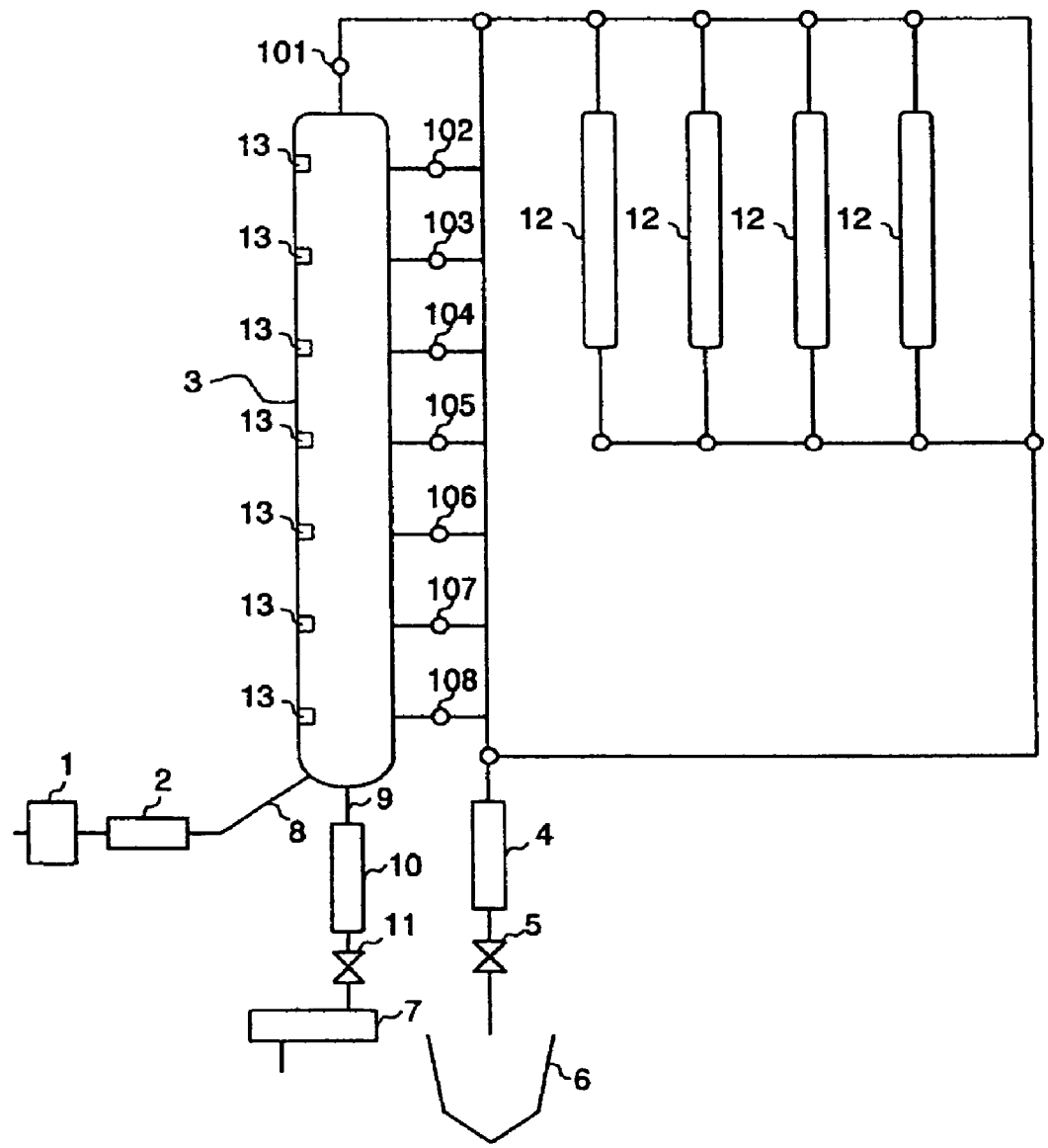
FIG. 2 is a schematic block diagram for illustrating another example of the sub-critical water decomposition apparatus according to the present invention.
Figure 3:
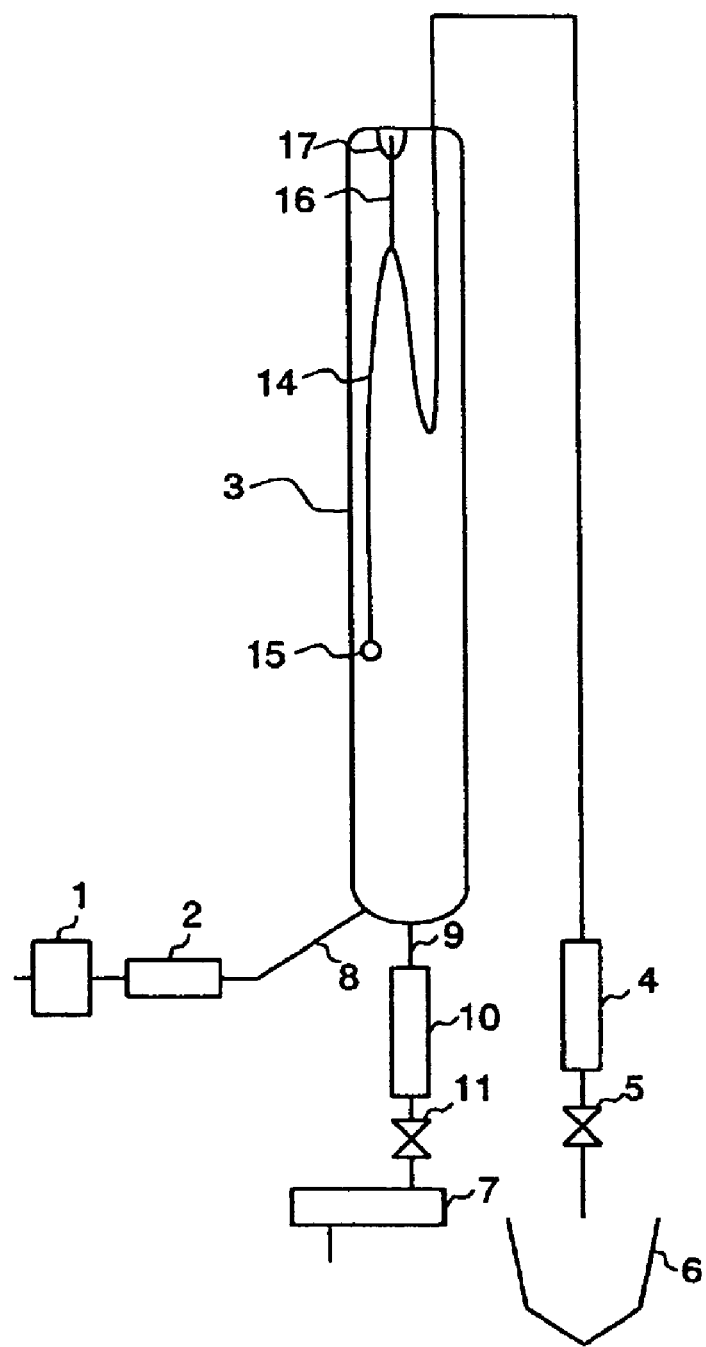
FIG. 3 is a schematic block diagram for illustrating yet another example of the sub-critical water decomposition apparatus according to the present invention.
Figure 4:
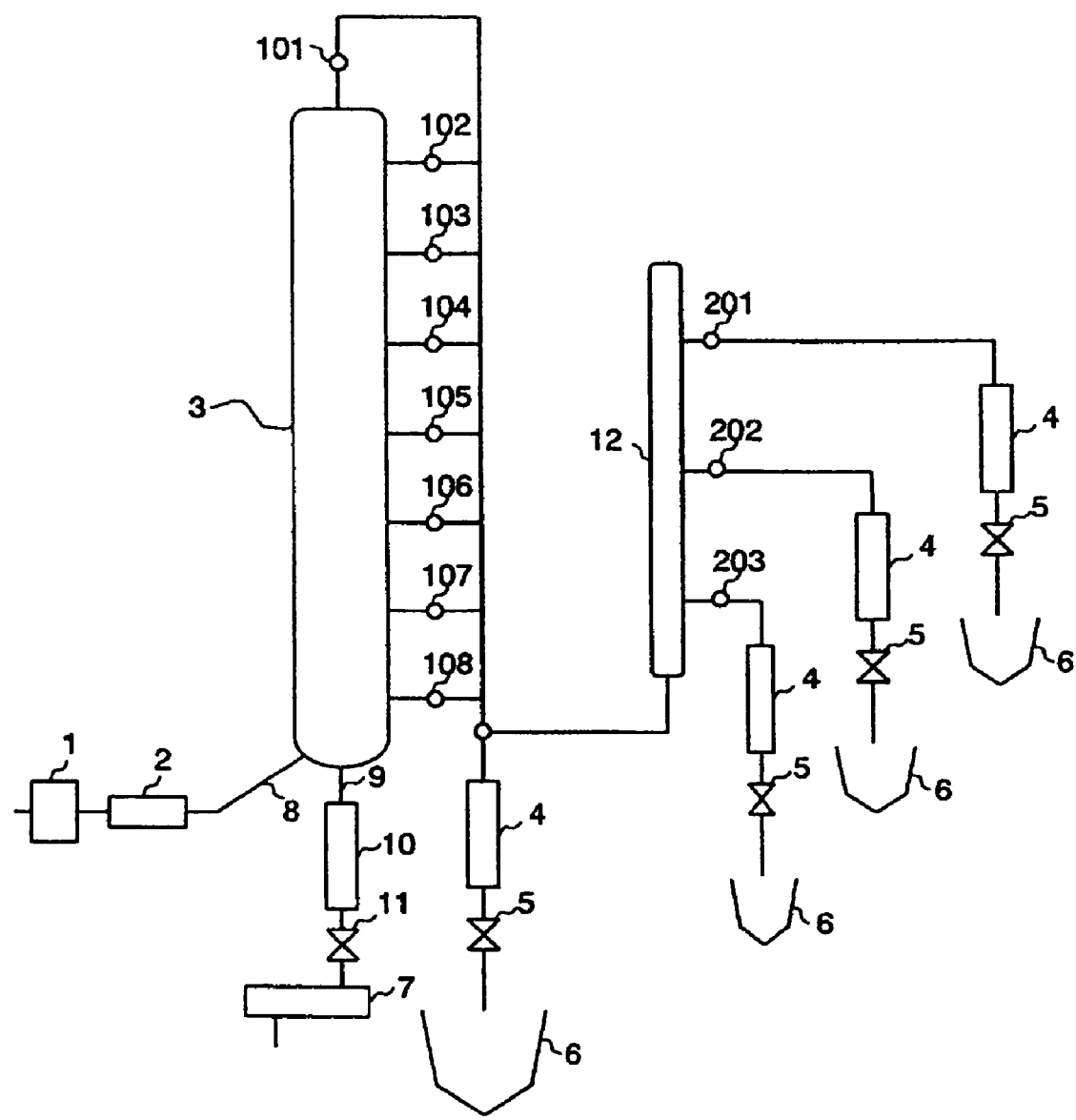
FIG. 4 is a schematic block diagram for illustrating still another example of the sub-critical water decomposition apparatus according to the present invention.
Figure 5:
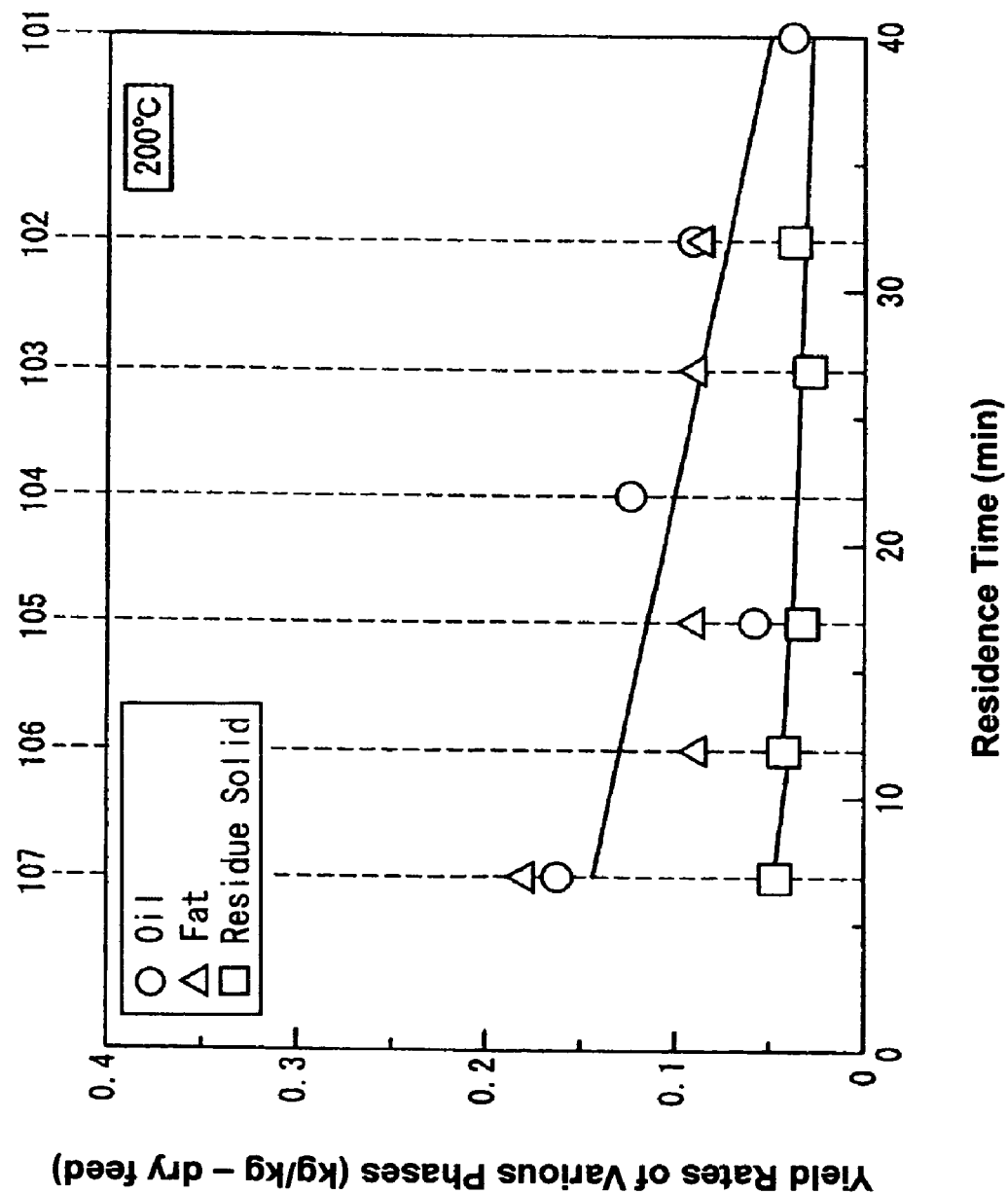
FIG. 5 is a graph illustrating yield rates of various phases versus residence time in one example of the present invention.
Figure 6:
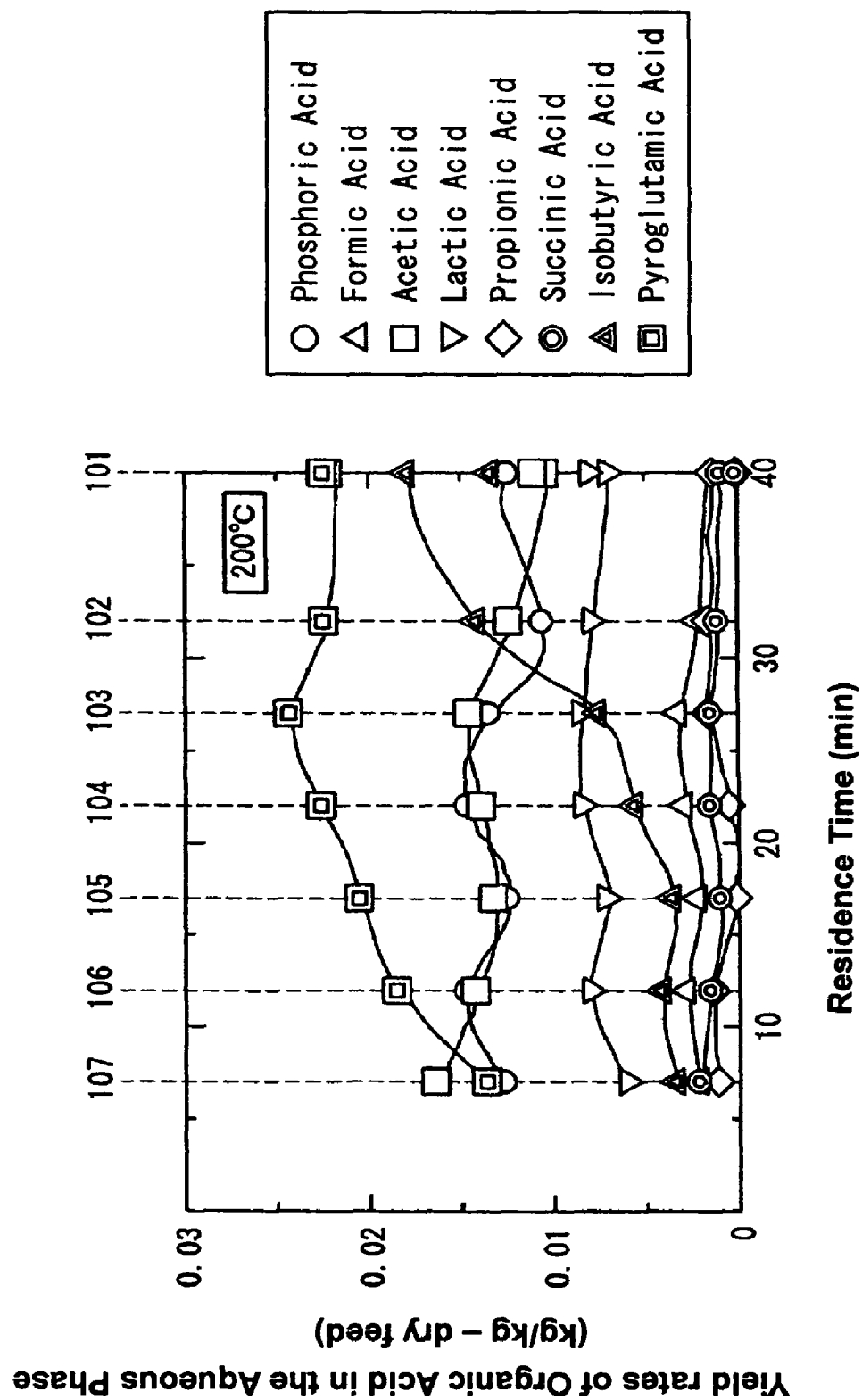
FIG. 6 is a graph illustrating yield rates of organic acids in the aqueous phase versus residence time in one example of the present invention.
Figure 7:
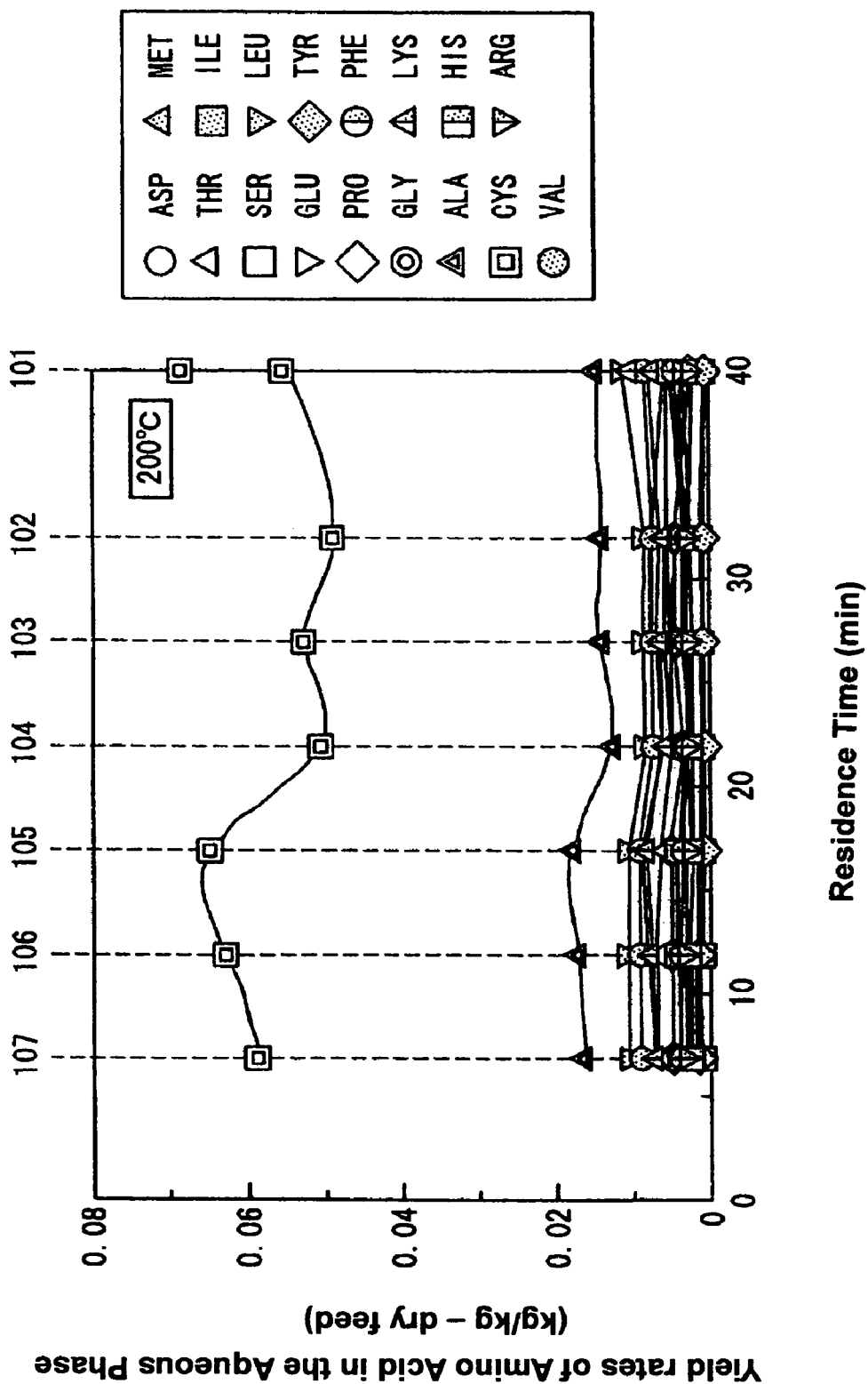
FIG. 7 is a graph illustrating yield rates of amino acids in the aqueous phase versus residence time in one example of the present invention.
Figure 8:
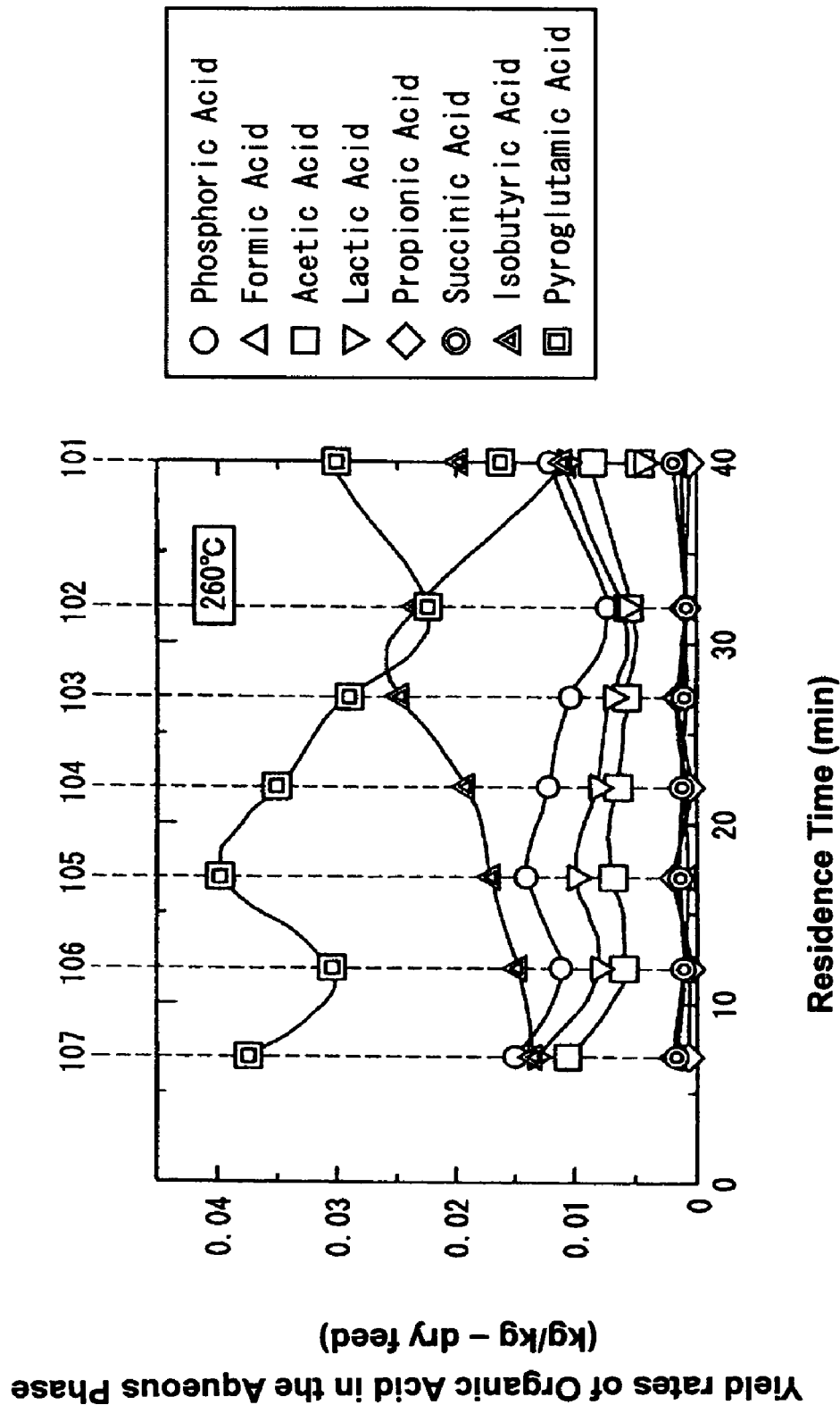
FIG. 8 is a graph illustrating yield rates of organic acids in the aqueous phase versus residence time in another example of the present invention.
Figure 9:
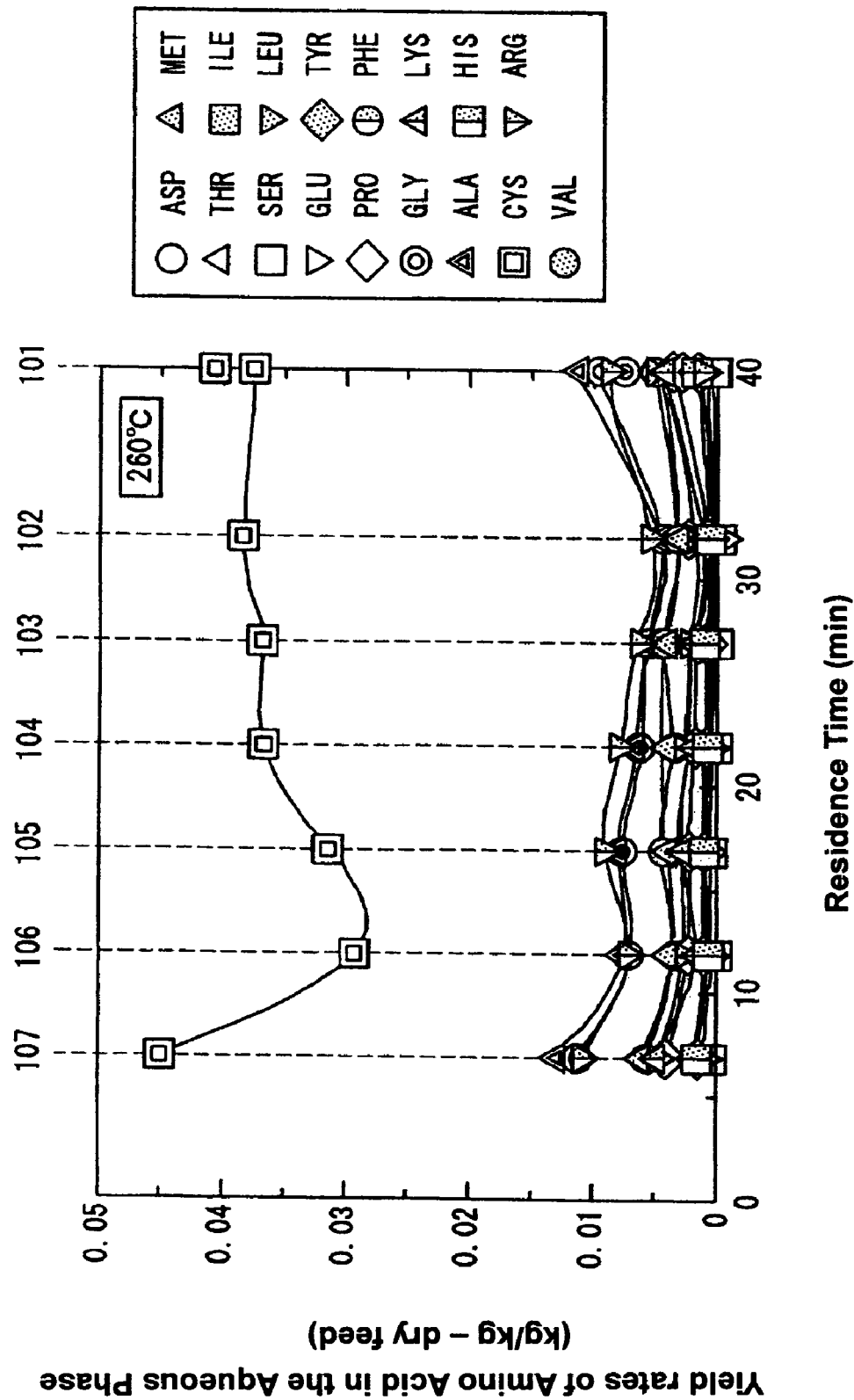
FIG. 9 is a graph illustrating yield rates of amino acids in the aqueous phase versus residence time in the other example of the present invention.
Figure 10:
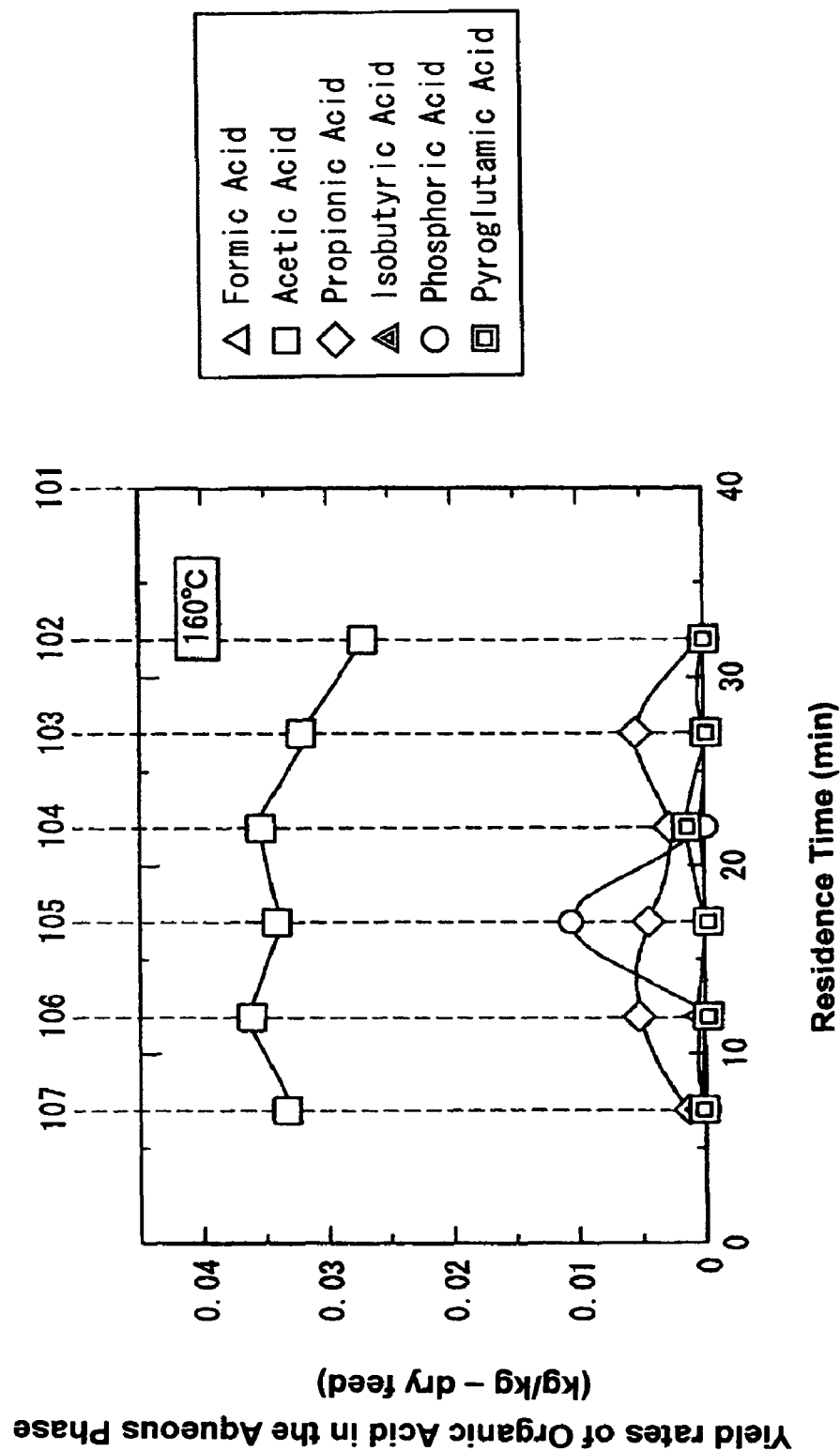
FIG. 10 is a graph illustrating yield rates of organic acids in the aqueous phase versus residence time in still another example of the present invention.
Figure 11:
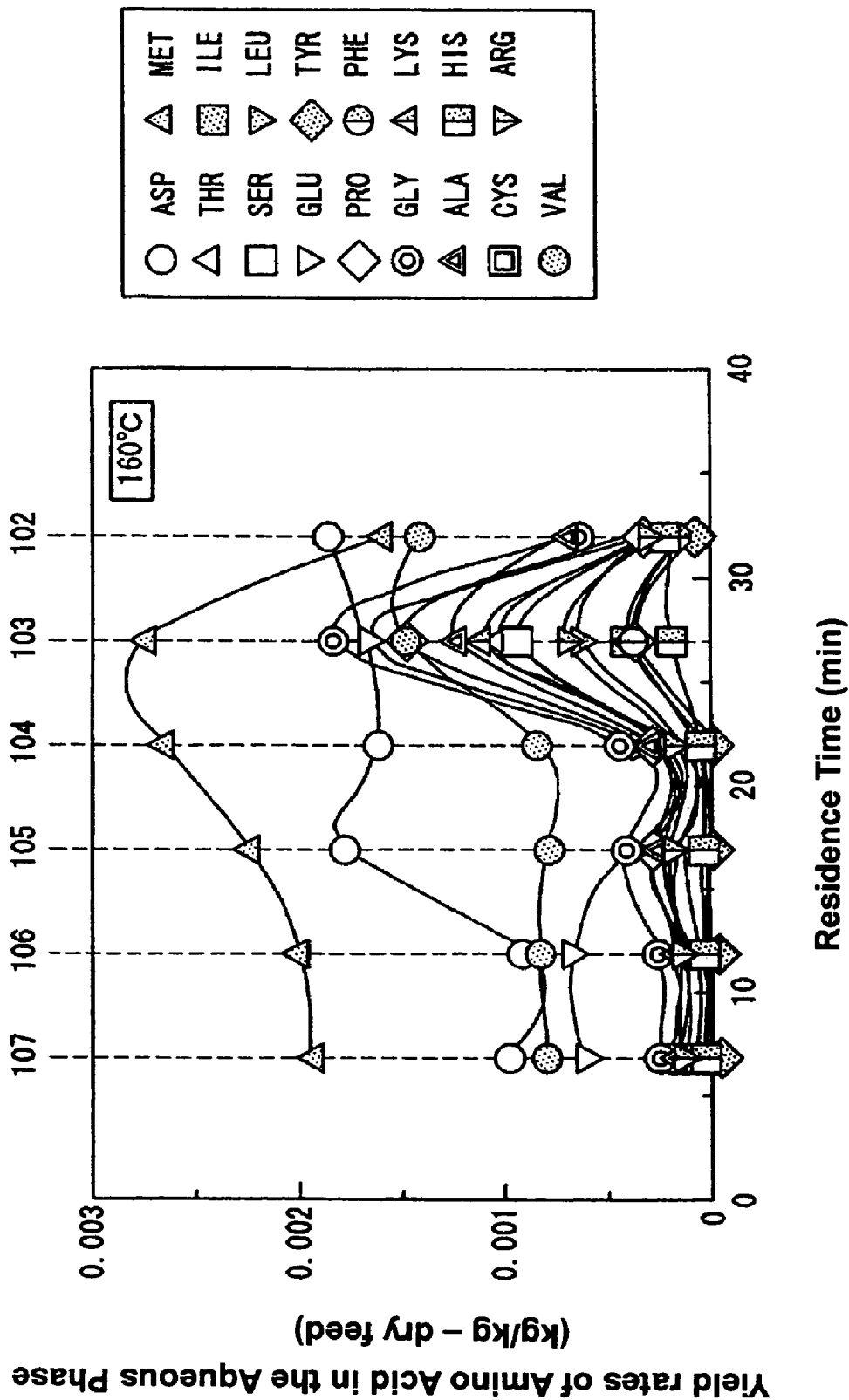
FIG. 11 is a graph illustrating yield rates of amino acids in the aqueous phase versus residence time in still another example of the present invention.
Figure 12:
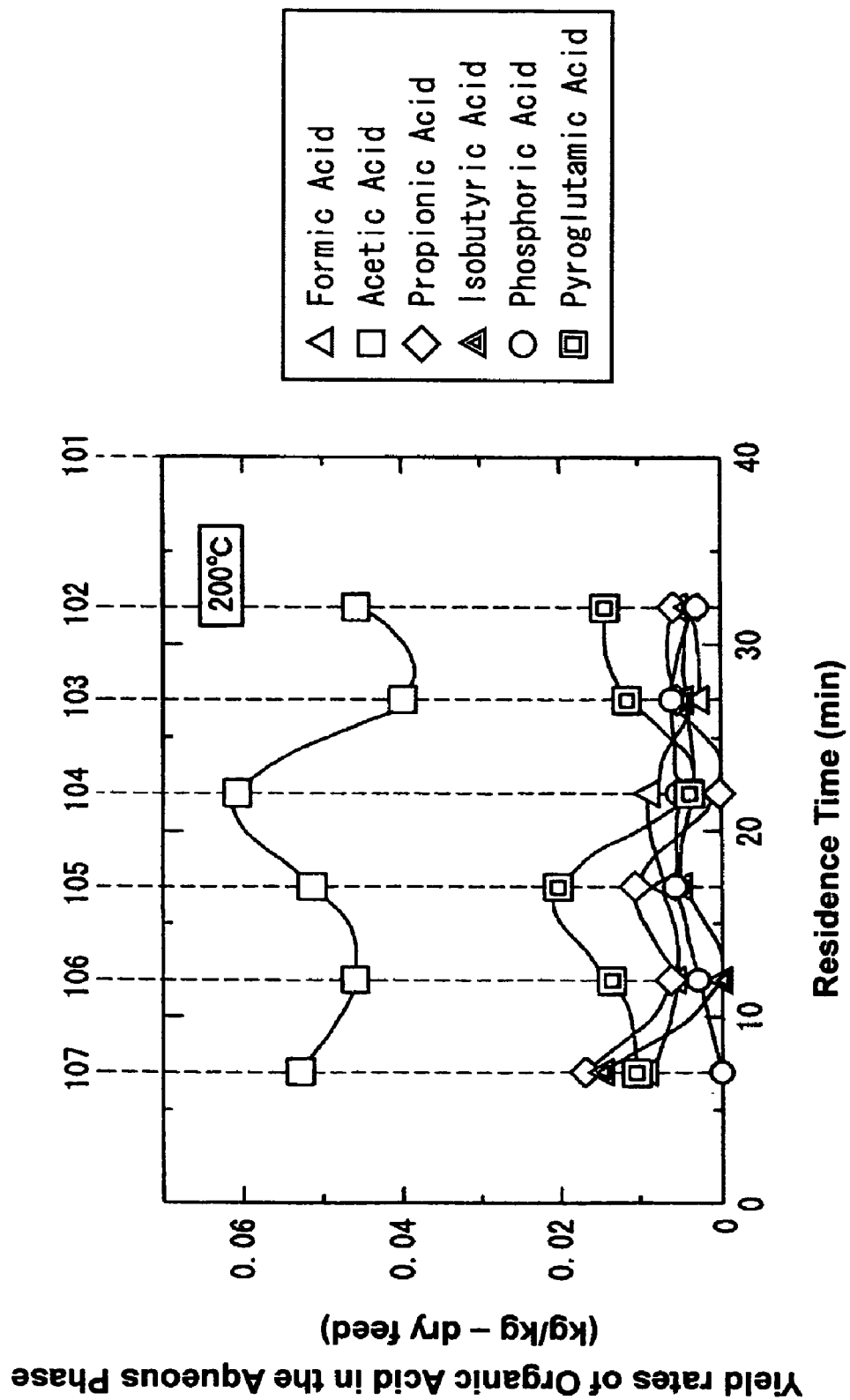
FIG. 12 is a graph illustrating yield rates of organic acids in the aqueous phase versus residence time in still another example of the present invention.
Figure 13:
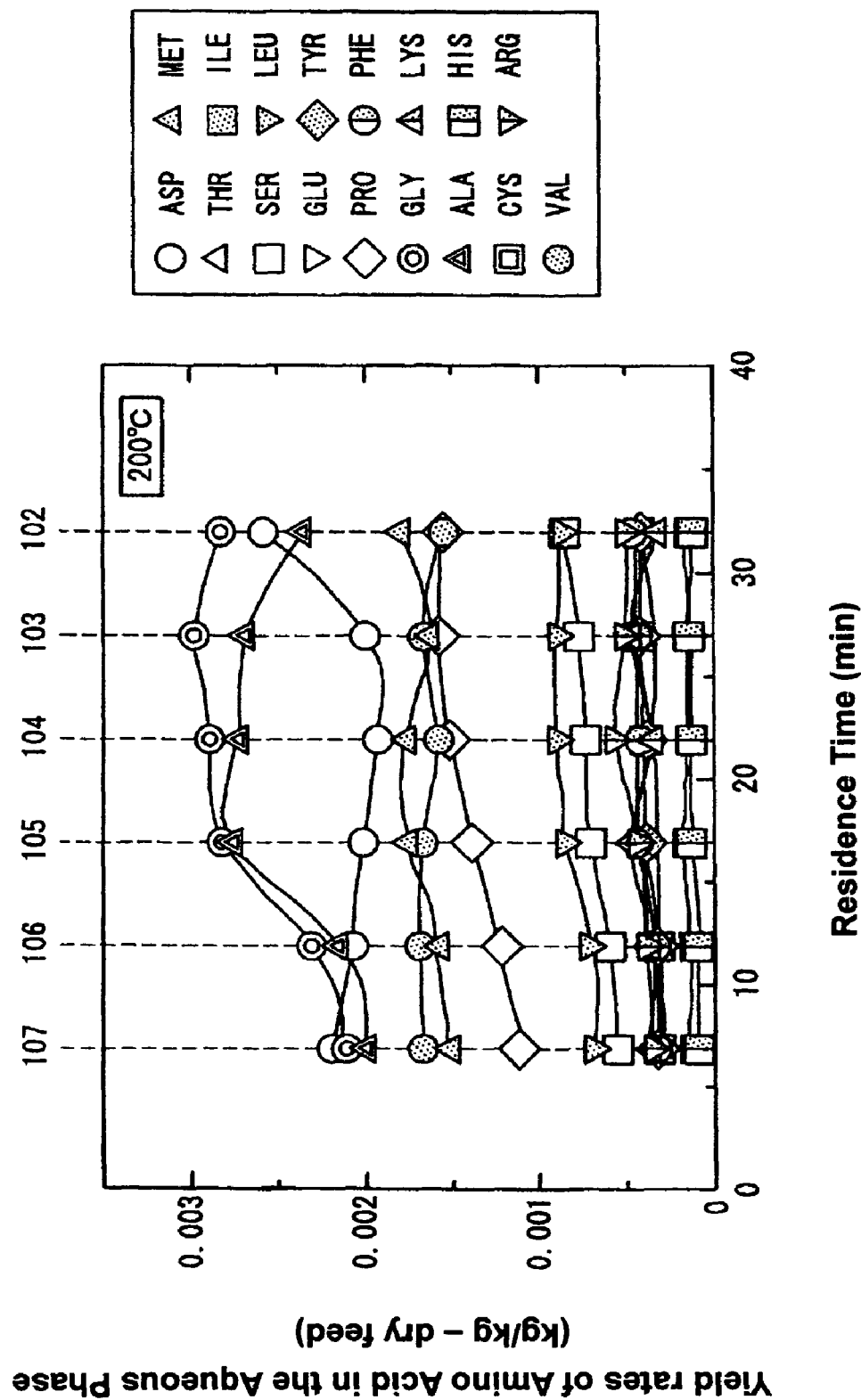
FIG. 13 is a graph illustrating yield rates of amino acids in the aqueous phase versus residence time in yet another example of the present invention.
Figure 14:
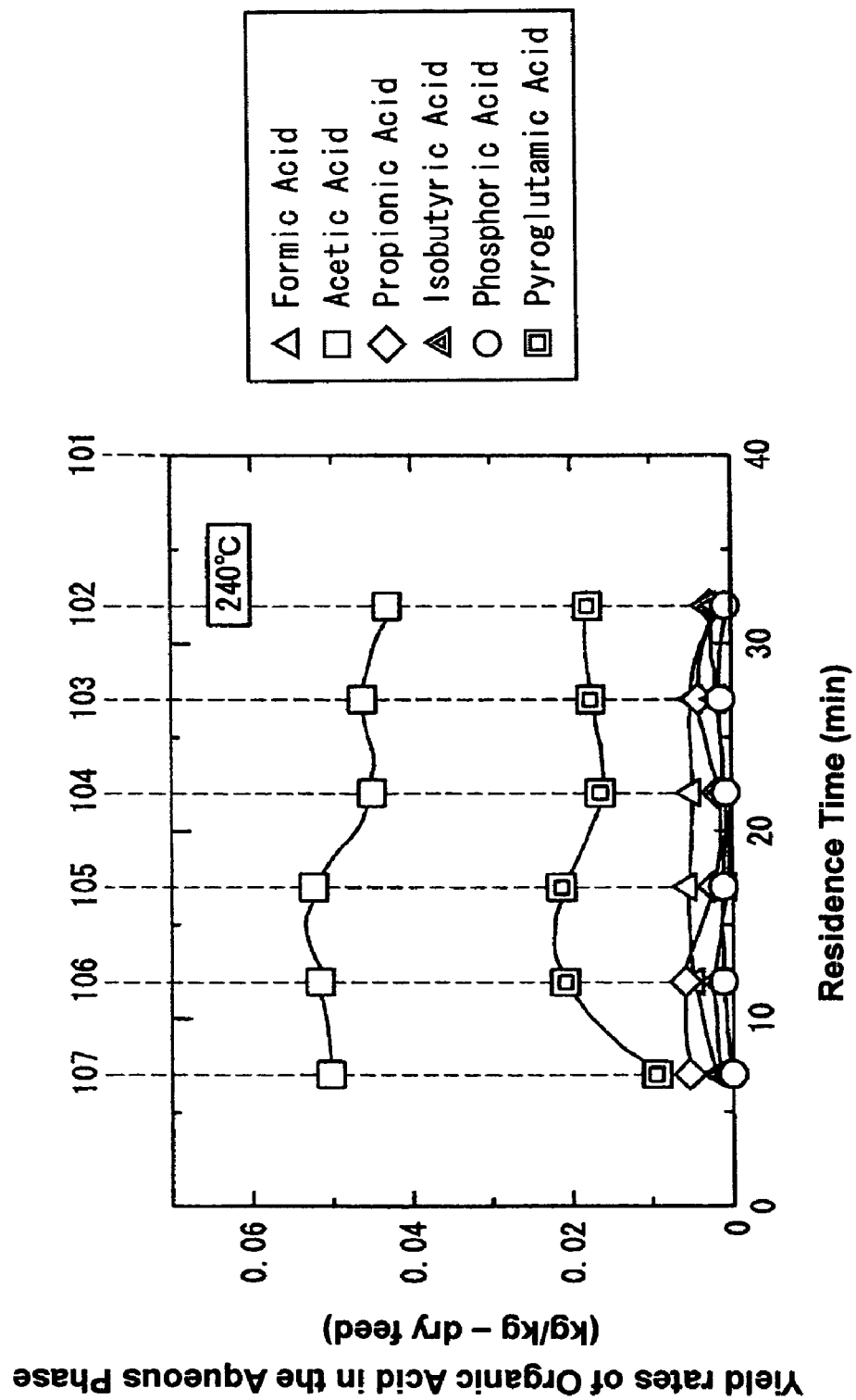
FIG. 14 is a graph illustrating yield rates of organic acids in the aqueous phase versus residence time in yet another example of the present invention.
Figure 15:
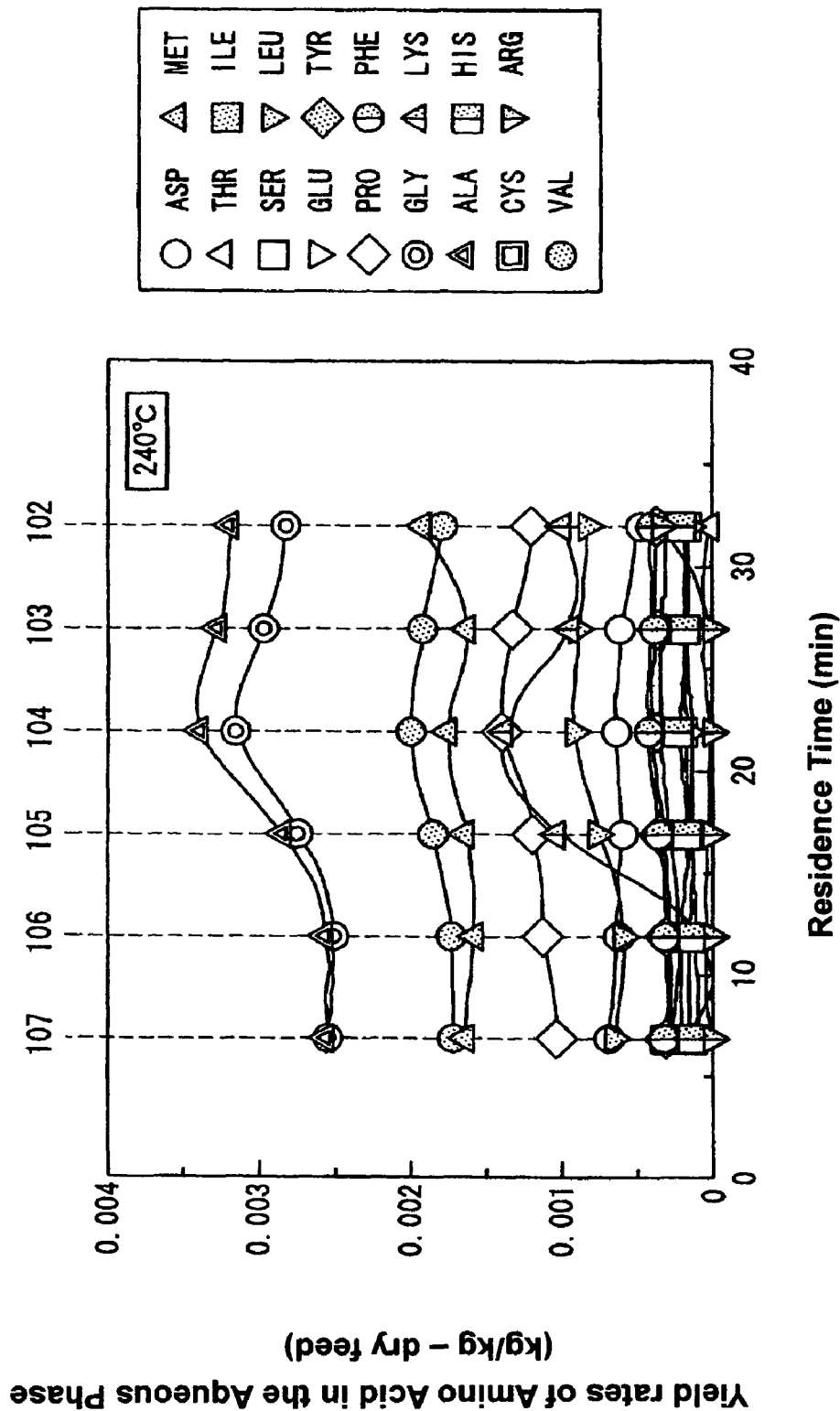
FIG. 15 is a graph illustrating yield rates of amino acids in the aqueous phase versus residence time in yet another example of the present invention.

DESCRIPTION OF REFERENCE NUMERALS 1 compressing means
2 heating means
3 reactor
4 cooling pipe
5 back-pressure valve
6 reaction-completed-product recovery tank
7 effluent recovery tank
8 inlet
9 discharge outlet
10 cooling pipe
11 back-pressure valve
12 reactor for secondary reaction
13 monitoring means
14 flexible pipe
15 intake port
16 chain
17 intra-reactor wheel
101, 102, 103, 104, 105, 106, 107, 108 outlet
201, 202, 203 outlet

The invention claimed is:

1. A method of producing sub-critical water decomposition products, comprising:
continuously supplying material to be processed that contains solid matter having a slow decomposition rate with sub-critical water and a different specific gravity from that of the sub-critical water, into a vertical reactor whose interior is kept at sub-critical conditions for water, through an inlet provided for the reactor;
selecting an outlet from which a liquid containing a decomposition product is let out and adjusting an outlet amount thereof, to make a steady flow in the sub-critical water in a steady state with a plurality of outlets provided at a position different in height from where the inlet is provided for the reactor, the steady flow flowing in an opposite direction to a direction in which the solid matter sinks or floats up and being slower than a sinking velocity or floating velocity of the solid matter;
forming in the steady flow, in the following order from upstream of the flow, at least a fluidized bed in which the solid matter is decomposed into fine particles by the sub-critical water and the fine particles fluidize in the flow, and a sub-critical water dissolution part in which the material to be processed is turned into further finer particles or completely turned into a soluble material to flow with the sub-critical water;
further forming, depending on a type of the material to be processed, a fixed bed in which solid matter stays in a fixed location even with the flow, the fixed bed being formed upstream of the fluidized bed; and
taking out the liquid containing a desired decomposition product from the sub-critical water dissolution part from the reactor, using at least one of the outlets.

2. The method according to claim 1, wherein a reaction temperature of the sub-critical water decomposition is within a range of from 130° C. to 374° C., and a reaction pressure is in a range equal to or higher than a saturated water vapor pressure at the reaction temperature.

3. The method according to claim 1, wherein the material to be processed is at least one material selected from food, livestock products, agricultural products, marine products, wood, natural organic matter, plastics, chlorinated organic compounds, rubber, fiber, and wastes thereof, as well as sewage treatment wastes and wastewater treatment wastes.

4. A method of producing sub-critical water decomposition products, comprising:
supplying a mixture including an object containing solid matter and subcritical water into a reaction container through a same inlet and causing the mixture to flow in sub-critical water in a steady state in an opposite direction to a direction in which the solid matter flows;
forming in the flow, in the following order from upstream of the flow, at least a fluidized bed in which the solid matter is decomposed into fine particles by the sub-critical water and the fine particles fluidize in the flow, and a sub-critical water dissolution part in which the material to be processed is turned into further finer particles or completely turned into a soluble material to flow with the sub-critical water;
further forming, depending on a type of the material to be processed, a fixed bed in which solid matter stays in a fixed location even with the flow, the fixed bed being formed upstream of the fluidized bed; and
adjusting a distance through which the sub-critical water dissolution part flows to vary a residence time of the solid matter and a residence time of the sub-critical water from each other and to adjust a degree of decomposition of the components of the material to be processed that have been made soluble to the sub-critical water, whereby a target decomposition treatment product is obtained.

5. The method according to claim 4, wherein the solid matter sinks in the mixture being in a steady state, and the flow of the mixture is in an opposite direction to that of a gravitational force.

6. The method according to claim 4, wherein the solid matter floats about in the mixture in a steady state, and the flow of the mixture is in a direction of a gravitational force.

7. The method according to claim 4, wherein, in the mixture in a steady state, a flow rate of the mixture is less than a sinking velocity or a floating velocity of the mixture.

8. The method according to claim 4, wherein the mixture is slurry.

9. The method according to claim 4, wherein a reaction temperature of the sub-critical water decomposition is within a range of from 130° C. to 374° C., and a reaction pressure is in a range equal to or higher than a saturated water vapor pressure at the reaction temperature.

10. The method according to claim 4, wherein the material to be processed is at least one material selected from food, livestock products, agricultural products, marine products, wood, natural organic matter, plastics, chlorinated organic compounds, rubber, fiber, and wastes thereof, as well as sewage treatment wastes and wastewater treatment wastes.

* * * * *